United States Patent
Sato et al.

(10) Patent No.: US 7,704,482 B2
(45) Date of Patent: Apr. 27, 2010

(54) PROCESS FOR PRODUCING CARBON NANOTUBE AND CATALYST FOR CARBON NANOTUBE PRODUCTION

(75) Inventors: Kenichi Sato, Nagoya (JP); Keisuke Fujita, Susono (JP); Masayuki Maeda, Nagoya (JP); Masahito Yoshikawa, Aichi (JP); Kazuyoshi Higuchi, Obu (JP)

(73) Assignee: TORAY Industries, Inc., Tokyo (JP)

( * ) Notice: Subject to any disclaimer, the term of this patent is extended or adjusted under 35 U.S.C. 154(b) by 0 days.

(21) Appl. No.: 12/087,125

(22) PCT Filed: Dec. 11, 2006

(86) PCT No.: PCT/JP2006/324653

§ 371 (c)(1),
(2), (4) Date: Aug. 8, 2008

(87) PCT Pub. No.: WO2007/074629

PCT Pub. Date: Jul. 5, 2007

(65) Prior Publication Data

US 2009/0022652 A1    Jan. 22, 2009

(30) Foreign Application Priority Data

Dec. 29, 2005  (JP) ............................. 2005-380679
Mar. 28, 2006  (JP) ............................. 2006-088344
Jun. 30, 2006  (JP) ............................. 2006-181440

(51) Int. Cl.
*D01F 9/12* (2006.01)
*B01J 23/02* (2006.01)

(52) U.S. Cl. ................... 423/447.3; 502/340; 977/842; 423/635

(58) Field of Classification Search ... 423/447.1–447.9; 502/102, 103, 106, 340
See application file for complete search history.

(56) References Cited

U.S. PATENT DOCUMENTS 3,839,193 A * 10/1974 Hayes ........................ 208/139
5,407,878 A *  4/1995 Kim ............................ 502/41
7,250,148 B2 * 7/2007 Yang et al. ............... 423/447.3
2004/0234445 A1 11/2004 Serp et al. ................ 423/447.3

(Continued)

FOREIGN PATENT DOCUMENTS

JP    2004-123505 A    4/2004

(Continued)

OTHER PUBLICATIONS

U.S. Appl. No. 12/215,405, filed Jun. 27, 2008, Sato et al.

(Continued)

*Primary Examiner*—Stuart Hendrickson
*Assistant Examiner*—Richard M Rump
(74) *Attorney, Agent, or Firm*—Kubovcik & Kubovcik

(57) ABSTRACT

Provided is a method for producing a carbon nanotube, wherein a catalyst for carbon nanotube production comprising a powdery catalyst supporting a metal on magnesia and having a bulk density of 0.30 g/mL to 0.70 g/mL, in a vertical reactor, is disposed over the whole area in a horizontal cross section direction of the reactor, in such state a carbon-containing compound flowed in a vertical direction inside the reactor is contacted with the catalyst at 500 to 1200° C., thereby carbon nanotubes of uniformity and high quality are efficiently synthesized in a large amount.

13 Claims, 16 Drawing Sheets

U.S. PATENT DOCUMENTS

| | | |
|---|---|---|
| 2004/0265210 A1 | 12/2004 | Shinohara et al. ........ 423/447.3 |
| 2005/0002851 A1* | 1/2005 | McElrath et al. ......... 423/447.3 |
| 2005/0074392 A1 | 4/2005 | Yang et al. ............... 423/447.3 |

FOREIGN PATENT DOCUMENTS

| JP | 2004-532180 A | 10/2004 |
|---|---|---|
| JP | 2006-511437 A | 4/2006 |
| JP | 2006-298713 A | 11/2006 |
| WO | 2004/096704 A2 | 11/2004 |

OTHER PUBLICATIONS

W.Z. Li et al. "Clean double-walled carbon nanotubes synthesized by CVD", Chemical Physics Letters, 368 (2003), pp. 299-306.

* cited by examiner

PROCESS FOR PRODUCING CARBON NANOTUBE AND CATALYST FOR CARBON NANOTUBE PRODUCTION

This application is a 371 of international application PCT/JP2006/324653 filed Dec. 11, 2008, which claims priority based on Japanese patent application Nos. 2005-380679 filed Dec. 29, 2005; 2006-088344 filed Mar. 28, 2006; and 2006-181440 filed Jun. 30, 2006, each of which is incorporated herein by reference.

TECHNICAL FIELD

The present invention relates to a method for producing a carbon nanotube. Further specifically, it relates to a method for producing a carbon nanotube by contacting a catalyst supporting a metal on a support with a carbon-containing compound in a vertical reactor.

BACKGROUND ART

A carbon nanotube has a tubular shape that one face of graphite is wound, one wound in one layer is called a single-walled carbon nanotube, one wound in two layers is called a double-walled carbon nanotube and one wound in multilayer is called a multi-walled carbon nanotube. Since a carbon nanotube has high mechanical strength and high electrical conductivity, it has been expected as an anode material for fuel cells and lithium secondary batteries, and as materials composed of composite materials with resin, metal and organic semiconductors for high strength resins, conductive resins, transparent conductive films, metal electrolytic powders, ceramic complexes and electromagnetic shielding materials. Further, since a carbon nanotube has a large L/D (length/outer diameter ratio) and an outer diameter of several nm, it has been expected as materials for a scanning tunnel microscope probe, field electron emission source and nano-pincette. Further, since a carbon nanotube has a nanosized space, it has been expected as adsorption materials of hydrogen etc., as materials of nanocapsule for medical purpose and MRI contrast agent. In any application, a carbon nanotube of high purity is required, and a single-walled or double-walled carbon nanotube with a small outer diameter is advantageous. Further, a carbon nanotube with few defects in graphite layer is excellent in characteristics.

As a method for producing carbon nanotubes, an arc discharge method, laser evaporation method, chemical vapor deposition method and the like are known. Above all, as a method for producing carbon nanotubes with few defects in graphite layer and high quality inexpensively, a catalyst chemical vapor deposition method is known. In the catalyst chemical vapor deposition method, there is known a method where a catalyst is supported on a support.

Non-patent document 1 reports a synthesis method of double-walled CNT using magnesia having mesoporous pores as a support, methane as a carbon source, and cobalt as a metal. However, as a reactor, a horizontal type is used, thus it is difficult to synthesize a lot of carbon nanotubes efficiently.

The present inventors have found that a method of contacting a catalyst that a metal is supported on a support with a carbon-containing compound at high temperature is a method for obtaining carbon nanotubes of high quality at high yield. Further, conventionally, carbon nanotubes are synthesized by disposing a catalyst in a horizontal reactor, but the present inventors have found that by using a vertical reactor, a raw gas can be contacted uniformly with a catalyst to react efficiently (Patent document 1). Synthesis of carbon nanotubes using a vertical reactor is also disclosed in Patent document 2.

Non-patent document 1: Chemical Physics Letters 368 (2003), 299-306
Patent document 1: Japanese Unexamined Patent Publication No. 2004-123505
Patent document 2: Tokuhyo Application No. 2006-511437 (Japanese translation of PCT publication)

DISCLOSURE OF THE INVENTION

Problems to be Solved by the Invention

In a method for producing carbon nanotubes by contacting a catalyst that a metal is supported on a support with a carbon-containing compound in a vertical reactor to date, there have been problems that removal of a support becomes troublesome and a raw gas does not pass uniformly through a catalyst supporting a metal on a support to cause a short path. The present invention was done in view of the above-described situations, and it is to provide a method that carbon nanotubes of uniformity and high quality are efficiently synthesized in a large amount.

Means to Solve the Problems

The method for producing a carbon nanotube of the present invention to solve the above-described problems is constituted as follows.

A method for producing a carbon nanotube, wherein a catalyst for carbon nanotube production comprising a powdery catalyst supporting a metal on magnesia and having a bulk density of 0.30 g/mL to 0.70 g/mL, in a vertical reactor, is disposed over the whole area in a horizontal cross section direction of the reactor, and a carbon-containing compound is flowed in a vertical direction inside the reactor to contact said carbon-containing compound with said catalyst at 500 to 1200° C.

A catalyst for carbon nanotube production comprising a catalyst supporting a metal on magnesia and having a bulk density of 0.30 g/mL to 0.70 g/mL.

EFFECT OF THE INVENTION

According to the present invention, by a method that using a vertical reactor, a specific catalyst supporting a metal on magnesia and a carbon-containing compound are contacted in a specific mode to produce a carbon nanotube, it becomes possible to produce carbon nanotubes of high quality efficiently in a large amount, and further the purification process can be simplified.

DESCRIPTION OF NUMBER AND SYMBOL

Figures 1A, 1B, 1C:
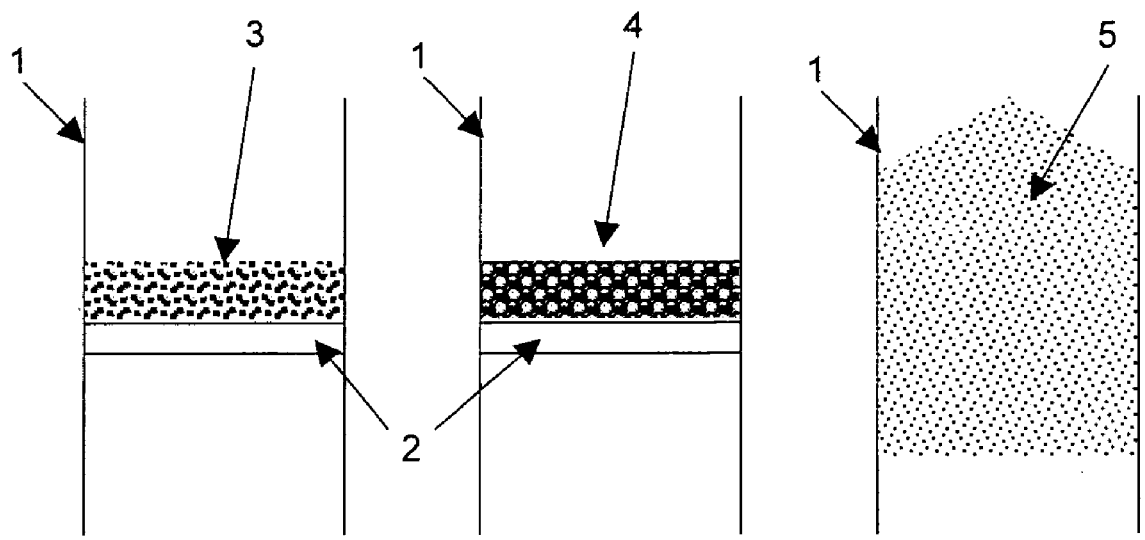
FIG. 1(a) is a conceptual illustration showing a state that a catalyst 3 is present entirely in a cross section direction of a reactor on a table 2 to place a catalyst in a reactor 1.
FIG. 1(b) is a conceptual illustration showing a state that a mixture 4 of a catalyst with a substance other than a catalyst is present entirely in a cross section direction of a reactor on a table 2 to place a catalyst in a reactor 1.
FIG. 1(c) a conceptual illustration showing a state that a catalyst 5 sprayed from the upper part of reactor 1 is spread entirely in a cross section direction of a reactor.

1: Reactor
2: Table
3: Catalyst
4: Mixture of catalyst and substance other than catalyst
5: Sprayed catalyst
100: Reactor
101: Quartz sintered plate
102: Sealed feeder of catalyst
103: Catalyst input line
104: Raw gas supply line
105: Waste gas line
106: Heater
107: Inspection port
108: Catalyst layer

BEST MODE FOR SUPPORTING OUT THE INVENTION

The present invention is a method for producing a carbon nanotube, where a catalyst for carbon nanotube production comprising a powdery catalyst supporting a metal on magnesia (hereinafter, also sometimes called simply "catalyst") and having a bulk density of 0.30 g/mL to 0.70 g/mL, in a vertical reactor, is disposed over the whole area in a horizontal cross section direction of the reactor, in such state the catalyst is contacted with a carbon-containing compound at 500 to 1200° C.

In the present invention, it is essential that a support supporting a metal is magnesia. By supporting a metal, a catalyst onto magnesia of a support, particle diameter of metal is controlled easily, and sintering hardly occurs under high temperature even if the metal is present in high density. Therefore, it is possible to efficiently synthesize carbon nanotubes of high quality in a large amount. Further, since magnesia solves in acidic aqueous solution, after synthesizing carbon nanotubes, only by treating the resulting composition with acidic aqueous solution, both magnesia and metal can be removed, which can simplify a purification process.

In the present invention, a vertical fluid bed reactor has a reactor which is installed in a vertical direction (hereinafter, sometimes called "longitudinal direction"), and has a mechanism that a carbon-containing compound flows in a direction toward the other end from one end of the reactor for the carbon-containing compound so as to pass through a catalyst layer formed by a catalyst for carbon nanotube production. As the reactor, for example, a reactor of tubular shape can be preferably used. Additionally, the vertical direction described above includes a direction having some angle of gradient to a vertical direction (for example, 90°±15° to a horizontal plane, preferably 90°±10°). Additionally, a vertical direction is preferable. Additionally, a feed section and a discharge section of a carbon-containing compound are not necessarily ends of a reactor, it is enough that a carbon-containing compound flows in the above-described direction and passes through a catalyst layer during the flowing process.

In the present invention, a catalyst is in a state that in a vertical reactor, it is disposed over the whole area in a horizontal cross section direction of the reactor. By doing so, it is possible to contact a catalyst supporting a metal on magnesia with a carbon-containing compound effectively. In the case of a horizontal reactor, in order to get such state, a catalyst must be sandwiched from both sides against the attraction of gravity. However, in a production reaction of carbon nanotubes, carbon nanotubes are produced on the catalyst as the reaction proceeds, and the volume of the catalyst increases, thus a method sandwiching the catalyst from both sides is not preferable. In the present invention, a reactor is a vertical type, a table that gas can transmit is equipped in the reactor, on which catalyst is placed, thereby catalyst can be uniformly present in the cross section direction of the reactor without sandwiching the catalyst from both sides. In the present invention, the state that catalyst is disposed over the whole area in the horizontal cross section direction of a vertical reactor means that catalyst spreads entirely in the horizontal cross section direction and a table at the bottom of catalyst is not seen. As preferable embodiments of such state, for example, there are the following modes.

A. a table for placing a catalyst that gas can transmit in a reactor (ceramic filter, etc.) is equipped, a catalyst is filled there by a predetermined thickness. The up and down sides of this catalyst layer may be somewhat concave-convex (FIG. 1(*a*)). FIG. 1(*a*) is a conceptual illustration showing a state that a table 2 for placing a catalyst is equipped in a reactor 1, on which a catalyst 3 is present entirely in the horizontal cross section direction of the reactor.

B. on the same table for placing a catalyst as in A, a catalyst and a material other than a catalyst (filler) are mixed and filled. Although this catalyst layer is preferably uniform, the up and down sides may be somewhat concave-convex (FIG. 1(*b*)). FIG. 1(*b*) is a conceptual illustration showing a state that a table 2 for placing a catalyst is equipped in a reactor 1, on which a mixture 4 of a catalyst with a material other than a catalyst is present entirely in the cross section direction of the reactor.

C. it is a state that by dropping a catalyst from an upper part of a reactor by spraying or the like, catalyst powder is present uniformly via gas in the horizontal cross section direction of the reactor (FIG. 1(c)). FIG. 1(c) a conceptual illustration showing a state that a catalyst 5 sprayed from an upper part of a reactor 1 is spread entirely in the horizontal cross section direction of the reactor.

The vertical reactor may be a fluid bed type or a fixed bed type. As one example of the vertical type, there are listed a mode that a catalyst is dropped from an upper part of a reactor by spraying or the like as described in C, and a mode that a catalyst flows being generally called a boiling bed type. Further, as an example of the fixed bed type, a mode like the foregoing A or B is mentioned.

In the fluid bed type, a catalyst is continuously fed, and a composition containing catalyst and carbon nanotubes after reaction is continuously drawn out, thereby a continuous synthesis is possible, which is preferable because carbon nanotubes can be efficiently obtained.

In contrast to a vertical reactor, a horizontal reactor denotes a reacting apparatus of a mode that a catalyst mounted on a quartz plate is placed in a reactor installed in a lateral direction (horizontal direction), a carbon-containing compound contacts catalyst by passing on the catalyst and reacts. In this case, a carbon nanotube is produced on the surface of catalyst, since a carbon-containing compound does not reach the inside of catalyst, reaction hardly takes place. In contrast to this, in a vertical reactor, since a carbon-containing compound of a raw material can contact the whole catalyst, it is possible to synthesize a lot of carbon nanotubes efficiently.

Since bulk density of catalyst is 0.30 g/mL or more, and 0.70 g/mL or less, it has been found that contact efficiency of the catalyst and carbon-containing compound becomes good, and carbon nanotubes of high quality can be efficiently synthesized in a large amount. When the bulk density of catalyst is less than 0.30 g/mL, there is a problematic point of difficult handling of catalyst. Further, when the bulk density of catalyst is too small, in contacting a carbon-containing compound with catalyst, there is a case that catalyst soars markedly in a vertical reactor, catalyst departs from a uniform heating zone of the reactor, and it becomes difficult to obtain carbon nanotubes of high quality. Further, when the bulk density of catalyst is more than 0.70 g/mL, it becomes difficult to contact the catalyst with a carbon-containing compound efficiently, all the same, it becomes difficult to obtain carbon nanotubes of high quality. When the bulk density of catalyst is too large, in disposing a catalyst in a vertical reactor, since the catalyst is closely packed, the uniform contact with a carbon-containing compound can not be done, and it becomes difficult to obtain carbon nanotubes of high quality. When the bulk density of catalyst is in the above-described range, contact efficiency of the carbon-containing compound and catalyst metal increases, so that it becomes possible to produce carbon nanotubes of high quality efficiently in a large amount. Further, when the bulk density of catalyst is too large, a catalyst hardly moves, there arises a problem of so-called short path that a carbon-containing compound only passes through most passable parts in a catalyst layer. When the bulk density of catalyst is in the above-described range, a catalyst moves, hardly causing a fixed short path. Therefore, it is necessary that bulk density of catalyst is 0.30 g/mL to 0.70 g/mL. The bulk density of catalyst is preferably 0.40 g/mL to 0.70 g/mL, and further preferably 0.50 g/mL to 0.70 g/mL.

Bulk density is a mass of powder per unit bulk volume. The measuring method of bulk density is shown below. The bulk density of powder is sometimes influenced by temperature and humidity in measurement. Bulk density herein is a value when measured at a temperature of 20±10° C. and humidity of 60±10%. Using a 50 mL graduated cylinder as a measuring container, powder is added to fill a predetermined volume while tapping the bottom of the graduated cylinder lightly. In measuring bulk density, it is preferable to add 10 mL or more of powder. Thereafter, after dropping of the bottom of the graduated cylinder from 1 cm height over a floor surface is repeated 20 times, the change rate of volume value occupied with powder is confirmed by eye within ±0.2 mL, and packing operation is finished. If there is change exceeding ±0.2 mL by eye in volume value, powder is further added while tapping the bottom of the graduated cylinder lightly, again dropping of the bottom of the graduated cylinder from 1 cm height over a floor surface is repeated 20 times, and no change exceeding ±0.2 mL in volume value occupied with powder is confirmed by eye and packing operation is finished. Obtaining the weight of powder of a constant amount packed by the above method is repeated 3 times, a value that the average weight is divided by the volume occupied with powder (=weight (g)/volume (mL)) is defined as bulk density of powder. A catalyst for carbon nanotube production to be measured is to be set to 20 g±5 g. Additionally, when the amount of catalyst for carbon nanotube production to be measured does not satisfy the above-described amount, it is to be measured with an assessable amount.

Bulk density of catalyst is influenced most is when a catalyst is contacted with a carbon-containing compound in heating temperature. It is unknown in detail that how the state of catalyst in this time is changed in comparison with that in the time of catalyst preparation (before reaction). However, bulk densities of catalyst before and after reaction do not noticeably change. Hence, by setting the bulk density of catalyst in the time of catalyst preparation (before reaction) to the above-described range, carbon nanotubes of high quality can be obtained.

Regarding magnesia, a commercial product may be used or one synthesized may be used. As a preferable production method of magnesia, there are methods where metal magnesium is heated in air, magnesium hydroxide is heated at 850° C. or more, and magnesium hydroxide carbonate $3MgCO_3 \cdot Mg(OH)_2 \cdot 3H_2O$ is heated at 950° C. or more.

Among magnesia, light magnesia is preferable. Light magnesia is magnesia with a low bulk density. In the present invention, light magnesia means a bulk density of 0.16 g/mL or less. Since bulk density of magnesia itself is small, it becomes possible to make bulk density small as a whole catalyst that metal is supported.

Further, magnesia having pores of 1 to 50 nm in diameter is preferable. By having pores of 1 to 50 nm in diameter in magnesia, since a certain amount of space volume is present in pores, it becomes possible to lower the bulk density as a whole catalyst supporting metal. Herein, 1 to 50 nm in pore diameter means that a peak top is in this range when pore distribution is measured as follows. Pore diameter is more preferably 1 to 30 nm, and further preferably 1 to 20 nm.

The surface area and pore distribution of magnesia can be obtained from physical adsorption of nitrogen at liquid nitrogen temperature. To magnesia placed under reduced pressure, nitrogen is gradually introduced, an adsorption isotherm curve of nitrogen is obtained from high vacuum to atmospheric pressure, when reached to atmospheric pressure, nitrogen is gradually decreased to obtain a desorption isotherm curve of nitrogen.

To obtain a pore diameter distribution including the region of 1 nm to 50 nm in pore diameter, generally, it is calculated using a desorption isotherm curve. As a theoretical formula to obtain a pore diameter distribution, Dollimore-Heal method is known (hereinafter abbreviated as D-H method). The pore diameter distribution defined in the present invention is one obtained by D-H method from a desorption isotherm curve of nitrogen. Generally, a pore diameter distribution can be obtained in such manner that pore diameter is put on a horizontal axis, and $\Delta Vp/\Delta Rp$ (Vp: volume when adsorbed nitrogen is liquefied, Rp: radius of pore) is put on a vertical axis. Further, pore volume can be obtained from the area of this graph. The pore volume is preferably 0.10 mL/g or more, and further preferably 0.15 mL/g or more.

Although low bulk density of magnesia itself is preferable, the bulk density when catalyzed differs markedly depending on the kind of metal to be supported, its amount and supporting method. With an increase in the amount of metal to be supported, the bulk density of catalyst supporting a metal on magnesia tends to increase.

The kind of metal used as catalyst is not particularly limited, it is preferably a metal of 3rd to 12th column, and particularly preferably a metal of 5th to 11th column is used. Above all, V, Mo, Mn, Fe, Co, Ni, Pd, Pt, Rh, W, Cu and the like are preferable. Further preferable are Fe, Co and Ni, and most preferable is Fe. Herein, a metal is not limited in a zerovalent state. It can be assumed to be a zerovalent state during reaction, but it may a compound widely containing a metal or metal spices. For example, there are used organic salts or inorganic salts such as formate, acetate, trifluoroacetate, ammonium citrate, nitrate, sulfate and halide salt; and complex salts such as ethylenediaminetetraacetate complex and acetylacetonate complex. Further, metal is preferably a fine particle. The particle diameter of a fine particle is preferably 0.5 to 10 nm. When metal is a fine particle, a carbon nanotube with small outer diameter tends to be produced.

One kind of metal may be supported or two kinds or more thereof may be supported. When supporting two kinds or more of metal, it is particularly preferable to include Fe.

The method to support a metal on magnesia is not particularly restricted. For example, magnesia is immersed in a nonaqueous solution that salt of metal to be supported is dissolved (for example, ethanol solution) or in an aqueous solution, sufficiently dispersed and mixed by stirring and ultrasonic irradiation, then dried (immersion method). Further, a metal may be supported on magnesia by heating at high temperatures (300 to 1000° C.) in a gas selected from air, oxygen, nitrogen, hydrogen, inert gas and mixed gas thereof, or in vacuum The more the supported amount of metal is, the higher the yield of carbon nanotube becomes, but when too much, the particle diameter of metal becomes large, and a carbon nanotube produced becomes thick. When the supported amount of metal is small, the particle diameter of metal to be supported becomes small, and a carbon nanotube with small outer diameter is obtained, but the yield tends to be lowered. The optimum supported amount of metal differs depending on pore content, outer surface area of magnesia and supporting method, it is preferable to support a metal of 0.1 to 20 weight % relative to magnesia. When two kinds or more of metals are used, the ratio is not restricted.

The magnesia supporting a metal thus obtained is filled in a vertical reactor.

The reactor is preferably heat resistant, and preferably made of heat resistant materials such as quartz and alumina.

By passing a carbon-containing compound from the lower part or upper part of a catalyst layer provided in a reactor, through contact with catalyst and reaction, carbon nanotubes are produced.

The temperature for contacting a catalyst with a carbon-containing compound is 500 to 1200° C. The temperature is preferably 600 to 950° C., and further preferably in a range of 700° C. to 900° C. When the temperature is lower than 600° C., the yield of carbon nanotubes becomes poor. Further, when the temperature is higher than 950° C., as well as material of a reactor used is restricted, carbon nanotubes start bonding each other, making the shape control of carbon nanotube difficult. A reactor may be set to a reaction temperature while contacting a carbon-containing compound with catalyst, or after completion of pretreatment with heat, a reactor is set to a reaction temperature, then feed of a carbon-containing compound may start.

Before a reaction for producing carbon nanotubes, a catalyst may be pretreated with heat. The time of pretreatment with heat is not particularly limited, but when it is too long, agglomeration of metal occurs on magnesia, leading to production of carbon nanotube with a large outer diameter sometimes, so that it is preferably within 120 minutes. The temperature of pretreatment may be lower than reaction temperature as long as catalyst activity is exhibited, may be the same as reaction temperature, or higher than reaction temperature. By conducting pretreatment with heat, there is a case that catalyst becomes a more active state.

Pretreatment with heat and reaction for producing carbon nanotubes are preferably conducted in reduced pressure or atmospheric pressure.

In the case where contact of a catalyst with a carbon-containing compound is conducted in reduced pressure, a reaction system can be reduced in pressure by a vacuum pump or the like. Further, in the case where pretreatment and reaction are conducted in atmospheric pressure, a mixed gas of a carbon-containing compound and a diluting gas may be contacted with a catalyst.

The diluting gas is not particularly limited, but one other than oxygen gas is preferably used. Oxygen is generally not used because of possibility of explosion, but it may be used outside the explosive range. As a diluting gas, nitrogen, argon, hydrogen helium and the like are preferably used. These gases have effects on control of linear velocity and concentration of a carbon-containing compound, and as a carrier gas. Hydrogen is preferable because it has an effect on activation of catalyst metal. A gas of high molecular weight like argon has a large annealing effect, and it is preferable when annealing is targeted. In particular, nitrogen and argon are preferable.

It is preferable that a carbon-containing compound is contacted with a catalyst for carbon nanotube production for the pyrolysis rate to be 10% or less. Pyrolysis of a carbon-containing compound induces by-product such as tar, soot, dimer and oligomer, and lowers the degree of graphitization and purity of carbon nanotubes produced. The pyrolysis of a carbon-containing compound is markedly influenced by concentration and linear velocity, and with lower concentration and higher linear velocity, the pyrolysis is more suppressed. On the other hand, reactivity of a carbon-containing compound, namely the yield of carbon nanotubes is inversely proportional to concentration and linear velocity, with higher concentration and lower linear velocity, the yield becomes higher. Therefore, to obtain carbon nanotubes of high degree of graphitization and high purity in a relatively large amount, concentration and linear velocity are controlled, and it is preferable to choose the best condition for balance in pyrolysis and production yield. The pyrolysis rate is preferably 8% or less, and most preferably 5% or less. The pyrolysis rate is preferably 0.1% or more, in particular, 1% or more is preferable.

Pyrolysis rate is a ratio that a carbon-containing compound degrades or reacts by thermal energy. The pyrolysis rate of a carbon-containing compound is measured by flowing a carbon-containing compound in a reaction system in the same conditions except no presence of catalyst to obtain a pyrolysis rate of a carbon-containing compound. Specifically, it is obtained as follows. A raw gas containing a carbon-containing compound is flowed in a given temperature region, and a given amount of gas is sampled before and after the given temperature region. For the gases sampled, each is quantitatively measured for the quantity of carbon-containing compound by chromatography, an amount decreased of carbon-containing compound before and after the given temperature region is obtained. For example, by using a peak area of the carbon-containing compound detected by gas chromatography equipped with a hydrogen flame ionization detector, pyrolysis rate can be obtained by the following formula.

Pyrolysis rate(%)=[1−{(peak area after flow(after pyrolysis))/(peak area before flow(before pyrolysis))}]×100

In the present invention, linear velocity of a carbon-containing compound in use is preferably 0.20 cm/sec or more. It is further preferably 0.50 cm/sec or more, and more preferably 1.00 cm/sec or more. When the linear velocity is too slow, pyrolysis rate of a carbon-containing compound becomes high, side reaction other than synthesis reaction of carbon nanotube proceeds, and impurities such as amorphous carbon tend to be produced more. Further, amorphous carbon produced adheres on the surface of catalyst metal, which inactivates the catalyst to hinder the synthesis of carbon nanotubes. On the other hand, when the linear velocity is too fast, a carbon-containing compound is not effectively used and exhausted, thus 100 cm/sec or less is preferably adopted. Linear velocity is a velocity that a carbon-containing compound passes through the foregoing reactor. The linear velocity is obtained by dividing a flowing velocity ($cm^3$/sec) of raw gas (carbon-containing compound+carrier gas) by a cross section area ($cm^2$) of site through which a carbon-containing compound passes. In particular, in the case where the carbon-containing compound is a carbon-containing compound having carbon numbers of 2 or more, the above-described range of linear velocity is preferable.

On the other hand, in the case where a carbon-containing compound is methane or a mixture containing methane, linear velocity is preferably $9.5 \times 10^{-3}$/sec or less. In this case, as described above, there is no problem even if linear velocity is 0.20 cm/sec or more, since methane is high in thermal stability and chemical stability, even under slow linear velocity, side reaction due to pyrolysis hardly occurs, and carbon nanotubes of high quality are produced.

In the case where a carbon-containing compound flows as a mixed gas, the concentration of a carbon-containing compound can be controlled by a diluting gas. When the concentration of a carbon-containing compound becomes high, yield is improved, but a thick carbon nanotube tends to be produced. The concentration of a carbon-containing compound in a mixed gas is preferably 2 vol % or less. Further, when the concentration of a carbon-containing compound in a mixed gas becomes low, a thin carbon nanotube is produced, but yield tends to be lowered. The concentration of a carbon-containing compound in a mixed gas is preferably 0.1 vol % or more. More preferable concentration of a carbon-containing compound is 0.2 vol % or more, and 1.5 vol % or less.

The carbon-containing compound used in the present invention is not particularly limited, preferably, hydrocarbon or an oxygen-containing carbon compound is used. Hydrocarbon may be aromatic or nonaromatic. As an aromatic hydrocarbon, for example, there can be used benzene, toluene, xylene, cumene, ethyl benzene, diethyl benzene, trimethyl benzene, naphthalene, phenanthrene, anthracene, or a mixture thereof. Further, as a nonaromatic hydrocarbon, for example, there can be used methane, ethane, propane, butane, pentane, hexane, heptane, ethylene, propylene, acetylene, or a mixture thereof. As oxygen-containing carbon compounds, for example, they may be alcohols such as methanol, ethanol, propanol and butanol; ketones such as acetone; aldehydes such as formaldehyde or acetaldehyde; ethers such as trioxane, dioxane, dimethyl ether and diethyl ether; esters such as ethyl acetate; carbon monoxide, or a mixture thereof. Among these, in particular, methane, ethane, ethylene, acetylene, propane and propylene are the most preferable carbon-containing compounds. Since these are gas at normal temperature and normal pressure, they are easily fed to reaction by specifying the feed rate as gas. In the case where other carbon-containing compounds are subjected to reaction under normal pressure, it is necessary to add a process such as evaporation.

A carbon nanotube-containing composition obtained by the production method of the present invention can be observed by a transmission electron microscope. The carbon nanotube-containing composition is a composition containing carbon nanotubes. For example, one including by-product such as catalyst metal and amorphous carbon right after synthesis of carbon nanotubes is exemplified. In a carbon nanotube-containing composition, it is preferable that 50 or more of 100 carbon nanotubes are in an inner diameter of 2 nm or less. When 50 or more of 100 carbon nanotubes are in an inner diameter of 2 nm or less in this manner, it is said that a main product is carbon nanotubes of 2 nm or less in inner diameter. The measurement of inner diameter of the carbon nanotube is supported out as follows: A carbon nanotube-containing composition is observed at a magnification of 1000000 by a transmission electron microscope, in a view of 150 nm square, 100 pieces of carbon nanotubes randomly selected from a view that 10% or more of view area is carbon nanotubes are measured for inner diameter. In the case where 100 pieces in one view cannot be measured, it is measured from a plurality of views till reaching 100 pieces. It is evaluated by an arithmetic average of the above-described measurements at 10 places.

A carbon nanotube-containing composition that a main product is carbon nanotubes of 2 nm or less in inner diameter is useful as an electron emission material, conductive film material, battery electrode material and the like. For example, when a carbon nanotube-containing composition is used as an electron source of field emission, the inner diameter is as thin as 2 nm or less, thus concentration of charge tends to take places, and applied voltage can be suppressed low.

In the present invention, by supporting a metal, a catalyst onto magnesia of a support, the particle diameter of metal is easily controlled, thus it became possible to support the metal as fine particle. Further, by using magnesia support, sintering hardly occurs under high temperature even if metal is present in high density. Therefore, it is possible to synthesize carbon nanotubes of high quality having 2 nm or less in inner diameter.

Further, the quality of a carbon nanotube-containing composition can be evaluated by a Raman spectroscopic analysis method. A laser wavelength used in a Raman spectroscopic analysis method is set to 633 nm. In a Raman spectrum, a Raman shift observed around 1590 $cm^{-1}$ is called G band derived from graphite, and a Raman shift observed around 1350 cm$^{-1}$ is called D band derived from amorphous carbon or defect of graphite. The higher this G/D ratio of carbon nanotube is, the higher the degree of graphitization is, which is high quality. It is possible to obtain high quality carbon nanotubes of 10 or more in G/D ratio at wavelength 633 nm when Raman scattering is measured.

The carbon nanotube-containing composition of the present invention may be used as in a state synthesized, but preferably, it is better to use it after removing magnesia and metal. It is possible to remove magnesia and metal by contacting a carbon nanotube-containing composition with acidic aqueous solution.

Further, after contacting a carbon nanotube-containing composition with oxygen, it is treated with acidic aqueous solution, which is preferable because carbon nanotubes of high purity and high yield are obtained. This is because in a carbon nanotube-containing composition, metal is covered with carbon compounds such as graphite and it is difficult to solve in acidic aqueous solution, but by contact with acidic aqueous solution after carbon surrounding the metal is once burned away, the metal can be efficiently removed.

Regarding the temperature for contacting a carbon nanotube-containing composition with oxygen, a temperature that carbon covering a metal in the composition can be removed is enough. Since it can be recovered at high yield without causing defects in graphite layers of carbon nanotube, 200 to 800° C. is preferable, 300 to 600° C. is more preferable, and 350 to 500° C. is further preferable temperature. Further, since carbon impurities such as amorphous carbon and nanoparticle start burning at lower temperature than that of carbon nanotube, by utilizing this difference of combustion temperatures, these impurities can also be removed at the above-described temperature. The time in contact with oxygen can be arbitrarily chosen in a range not causing defects in graphite layers of carbon nanotube.

As the kind of acidic aqueous solution contacting a carbon nanotube-containing composition, aqueous solution of hydrofluoric acid, sulfuric acid, hydrochloric acid, nitric acid and the like can be used, these may be used alone or in mixture of two kinds or more thereof.

Further, regarding the acidic aqueous solution, an acidic aqueous solution of pH 5 or less, more preferably pH 4 or less, further preferably pH 3 or less is used, which is preferable in removal efficiency of impurity. The time, concentration, temperature and pressure in contact with acidic aqueous solution are not particularly limited, and they can be arbitrarily set in a range removing impurities efficiently and not causing defects in graphite layers of carbon nanotube. Within the above-described range, they may be set to high temperature and high pressure or to a condition that a supercritical state is achieved. As a more specific operation method, there can be mentioned a method that a carbon nanotube-containing composition is charged in an acidic aqueous solution of pH 5 or less (more preferably pH 4 or less, further preferably pH 3 or less) (for example, aqueous hydrofluoric acid solution, aqueous hydrochloric acid solution, aqueous sulfuric acid solution, aqueous nitric acid solution, etc.), and stirred for about 1 to 10 hours.

The carbon nanotube-containing composition of the present invention is useful as an electron emission material, conductive film material, battery electrode material and the like. For example, when a carbon nanotube-containing composition is used as an electron source of field emission, the outer diameter is thin and concentration of charge tends to take places, thus applied voltage can be suppressed low.

Hereinafter, the present invention will be described specifically by Examples. The following Examples are shown for illustration, and they should not be used to construe the present invention in a limited way.

EXAMPLES

In Examples, various evaluations of physical properties were supported out by the following methods.

[Bulk Density]

Using a 50 mL graduated cylinder as a measuring container, powder was added therein for a volume occupied with powder to be 20 mL while tapping the bottom of the graduated cylinder lightly. Thereafter, after dropping of the bottom of the graduated cylinder from 1 cm height over a floor surface was repeated 20 times, no change of volume value was confirmed by the foregoing method. Obtaining the weight of powder packed by the above method was repeated 3 times, and the average weight was divided by 20 mL (=weight (g)/volume (mL)) to measure bulk density of powder. Further, the evaluation of bulk density was conducted at a temperature of 20±10° C. and humidity of 60±10%.

[Thermal Analysis]

About 10 mg of a sample was placed in a thermogravimetric analyzer (TGA-60 manufactured by Shimadzu Corporation), raised to 900° C. from room temperature in air at a rising temperature velocity of 10° C./min. Then, decrease in weight due to combustion was shown in %.

[Raman Spectroscopic Analysis]

A powder sample was placed in a resonant Raman spectrometer (INF-300 manufactured by Horiba Jobin Yvon S.A.S.), measurement was conducted using a laser wavelength of 633 nm.

[High-resolution Transmission Electron Microscope Image]

A sample dispersed in ethanol was added on a grid, and dried. The grid that the sample was coated in this manner was placed in a transmission electron microscope (H-9000UHR III manufactured by Hitachi, Ltd.) and measured.

Example 1

Supporting Metal Salt on Light Magnesia 2.46 g of iron ammonium citrate (manufactured by Wako Pure Chemical Industries Ltd.) was dissolved in 125 mL of methanol (manufactured by Kanto Chemical Co., Ltd). To this solution, 25.0 g of light magnesia (manufactured by Wako Pure Chemical Industries Ltd.) was added, treated for 60 minutes by an ultrasonic cleaner, and methanol was removed by drying at 80° C., thereby to obtain a solid catalyst that metal salt was supported on light magnesia powder. The bulk density of the catalyst obtained was 0.68 g/mL.

(Synthesis of Carbon Nanotubes)

On a nonwoven made of silica/alumina, 4.0 g of the solid catalyst prepared above was sampled, which was placed in the center part heated at 800° C. of a quartz reactor of 135 mm in inner diameter installed in a vertical direction to provide a catalyst layer. The mode that the solid catalyst was present in the reactor is shown in FIG. 1(a). Argon gas was supplied toward the upper part direction of reactor from the bottom part of reactor at 20 L/min for 5 minutes, and flowed to pass through the catalyst layer. Thereafter, acetylene gas was further introduced at 160 mL/min for 4 minutes and aerated to pass through the catalyst layer for reaction. In this time, linear velocity of acetylene gas is 2.35 cm/sec and concentration is 0.79 vol %. The introduction of acetylene gas was stopped, and argon gas was flowed at 20 L/min for 1 minute, then, a composition containing catalyst and carbon nanotubes was taken out and cooled to room temperature.

(Thermal Analysis of Carbon Nanotube-containing Composition)

The thermal analysis of the carbon nanotube-containing composition thus obtained was conducted to find the weight decrease of 11%, and indicate the production of a lot of carbon nanotubes.

(Resonant Raman Spectroscopic Analysis of Carbon Nanotube-containing Composition)

Figure 2:
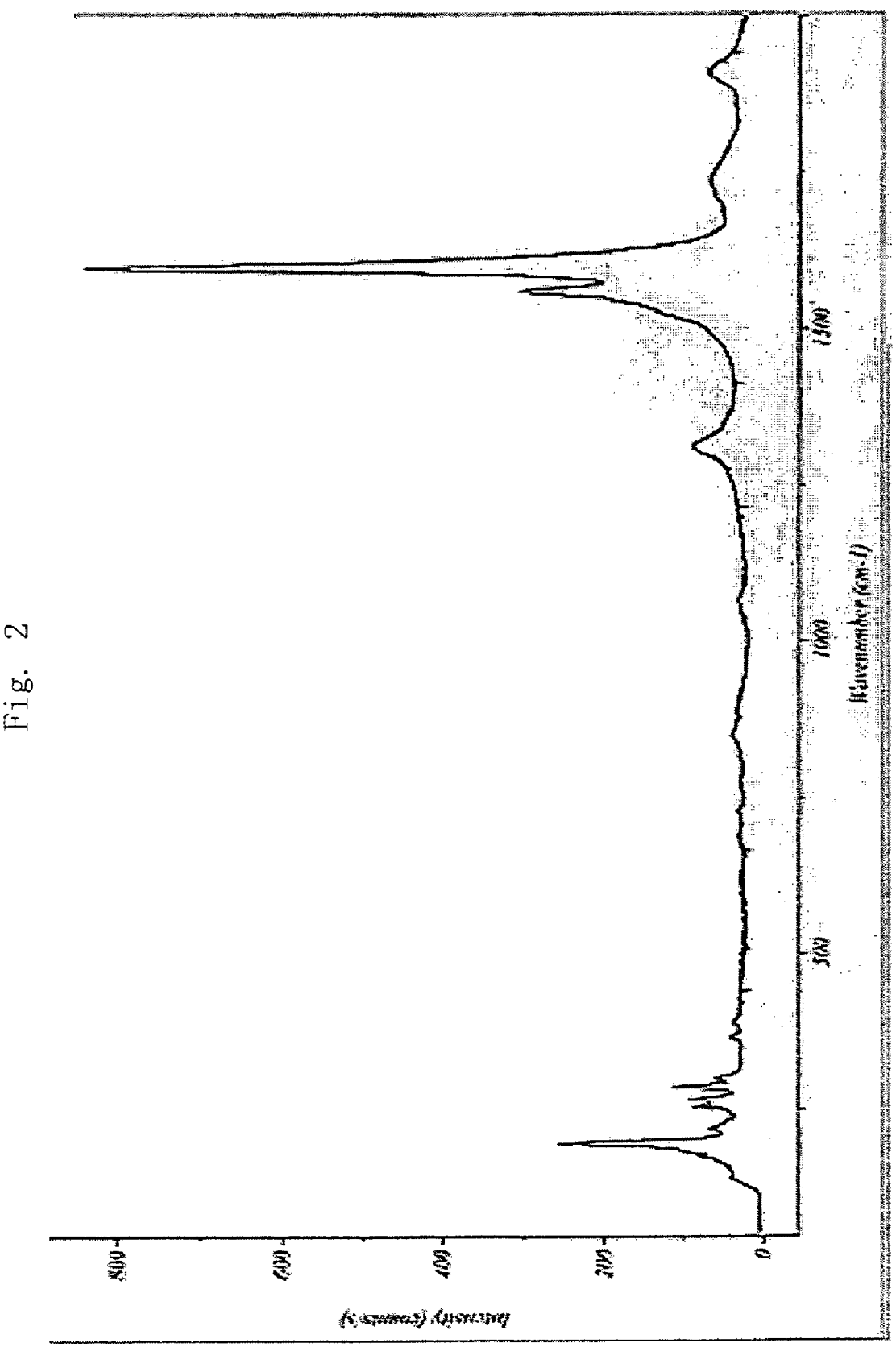
FIG. 2 is a chart of Raman spectrum of the carbon nanotube-containing composition obtained in Example 1.

The carbon nanotube-containing composition thus obtained was measured by a resonant Raman spectrometer, as a result, it was known that G/D ratio was 14 showing high-quality carbon nanotubes (FIG. 2).

(High-resolution Transmission Electron Microscope Analysis of Carbon Nanotube-containing Composition)

Figure 3:
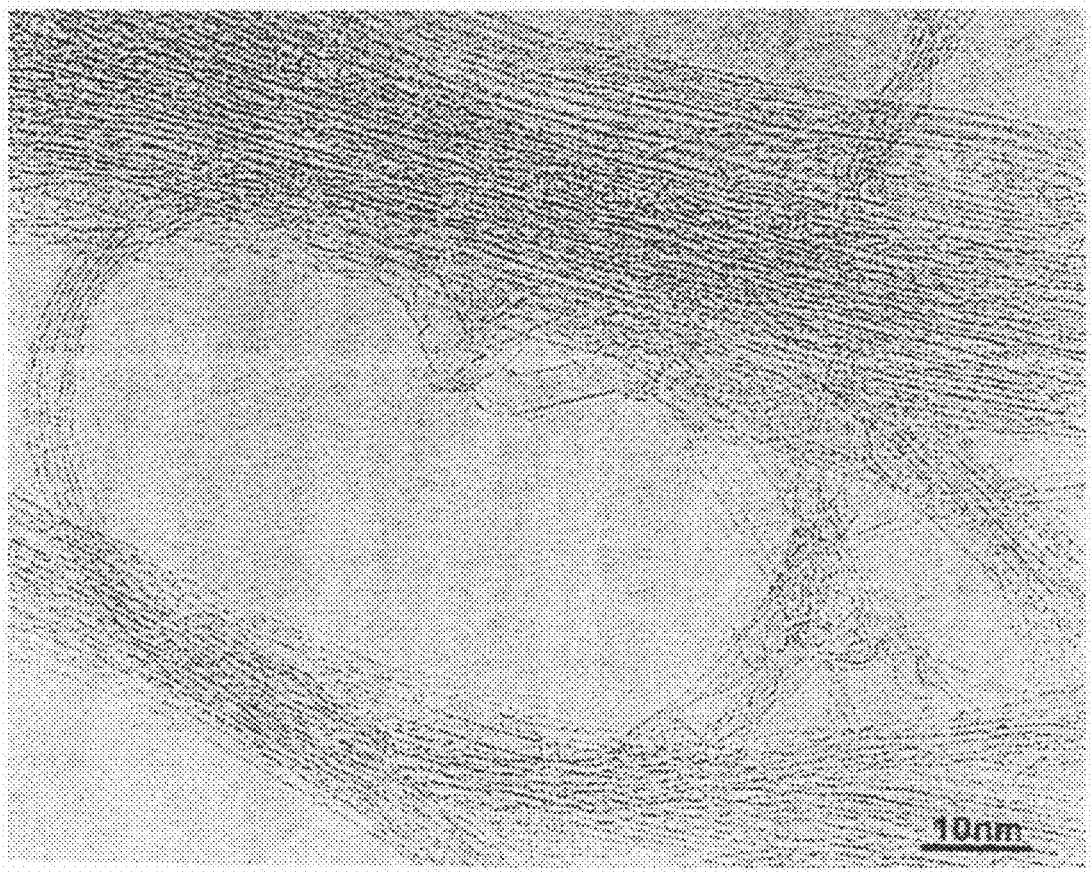
FIG. 3 is a high-resolution transmission electron microscope image of the carbon nanotube-containing composition obtained in Example 1.

The carbon nanotube-containing composition thus obtained was observed using a high-resolution transmission electron microscope by the foregoing method, as a result, the carbon nanotubes were constituted by beautiful graphite layers, and of 100 pieces of carbon nanotubes, carbon nanotubes with inner diameter of 2 nm or less were 80 pieces or more. Carbon impurities (fullerene, nanoparticle, amorphous carbon, etc.) other than carbon nanotube were hardly observed (FIG. 3).

Example 2

Supporting Metal Salt on Mesoporous Magnesia 2.95 g of iron ammonium citrate (manufactured by Wako Pure Chemical Industries Ltd.) was dissolved in 150 mL of methanol (manufactured by Kanto Chemical Co., Ltd). To this solution, 30.0 g of Starmag HP10 (manufactured by Konoshima Chemical Co., Ltd., magnesia having pores of 3.6 nm diameter and pore volume of 0.20 mL/g) was added, treated for 60 minutes by an ultrasonic cleaner, and methanol was removed by drying at 80° C., thereby to obtain a solid catalyst that metal salt was supported on mesoporous magnesia powder. The bulk density of the catalyst obtained was 0.50 g/mL (Synthesis of Carbon Nanotubes)

A composition containing catalyst and carbon nanotubes was obtained by conducting reaction in the same reaction system and reaction condition as in Example 1 except that the solid catalyst prepared above was used.

(Thermal Analysis of Carbon Nanotube-containing Composition)

The thermal analysis of the carbon nanotube-containing composition thus obtained was conducted to find the weight decrease of 14%, and indicate the production of a lot of carbon nanotubes.

(Resonant Raman Spectroscopic Analysis of Carbon Nanotube-containing Composition)

Figure 4:
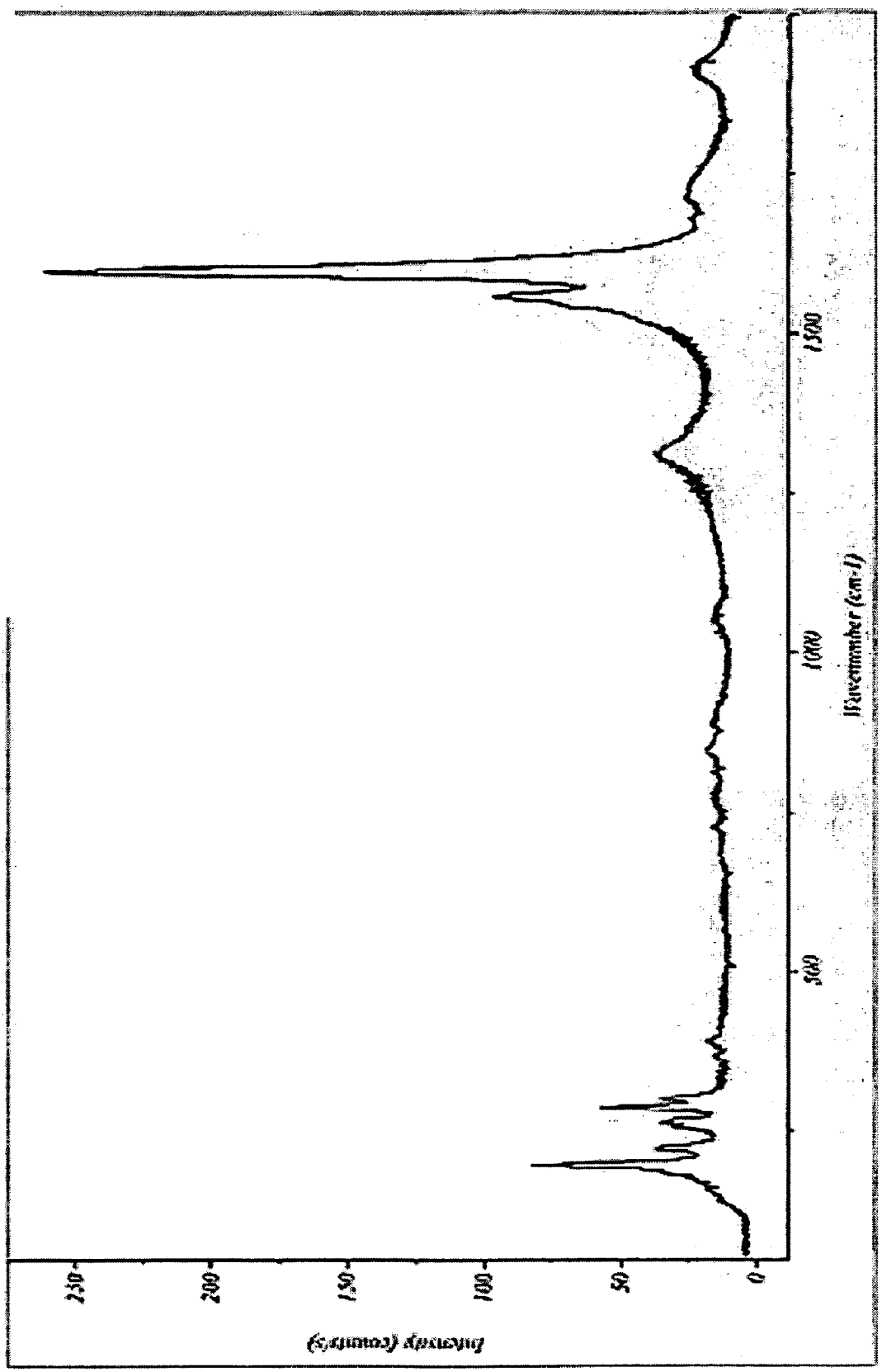
FIG. 4 is a chart of Raman spectrum of the carbon nanotube-containing composition obtained in Example 2.

The composition containing carbon nanotubes thus obtained was measured by a resonant Raman spectrometer, as a result, it was known that G/D ratio was 12 showing single-walled carbon nanotubes of high quality (FIG. 4).

(High-resolution Transmission Electron Microscope Analysis of Composition Containing Carbon Nanotubes)

The carbon nanotube-containing composition thus obtained was observed using a high-resolution transmission electron microscope, as a result, the carbon nanotubes were constituted by beautiful graphite layers, and carbon nanotubes with inner diameter of 2 nm or less were 80 pieces or more. Carbon impurities (fullerene, nanoparticle, amorphous carbon, etc.) other than carbon nanotube were hardly observed.

Example 3

Supporting Metal Salt on Light Magnesia 0.5 g of iron ammonium citrate (manufactured by Wako Pure Chemical Industries Ltd.) was dissolved in 25 mL of methanol (manufactured by Kanto Chemical Co., Ltd). To this solution, 5 g of light magnesia (manufactured by Wako Pure Chemical Industries Ltd.) was added, treated for 60 minutes by an ultrasonic cleaner, and methanol was removed by drying while stirring at 40° C. to 60° C., thereby to obtain a solid catalyst that metal salt was supported on light magnesia powder. The bulk density of the catalyst obtained was 0.61 g/mL.

(Synthesis of Double-walled Carbon Nanotubes)

On a quartz wool in the center of a vertical quartz tube of 64 mm in inner diameter, 1.0 g of the solid catalyst prepared above was sampled, and air was supplied at 1600 mL/min. The quartz tube was placed in an electric furnace and a center temperature was raised to 900° C. over 120 minutes. After reaching 900° C., it was purged with nitrogen gas at 1000 mL/min for 10 minutes, then methane gas (manufactured by Koatsu Gas Kogyo Co., Ltd.) at 11 mL/min and nitrogen gas at 255 mL/min were supplied under a reaction pressure condition of $1 \times 10^5$ Pa (1 atmospheric pressure) for 60 minutes, then, supply of methane gas was stopped, and the temperature was cooled to room temperature under a stream of nitrogen to take out a composition containing catalyst and carbon nanotubes. The linear velocity of methane in this reaction condition was $5.64 \times 10^{-3}$ cm/sec, and the concentration was 4.7 vol %. All gases flowing in the reaction tube were flowed toward an upper part direction from the lower part.

Figure 5:
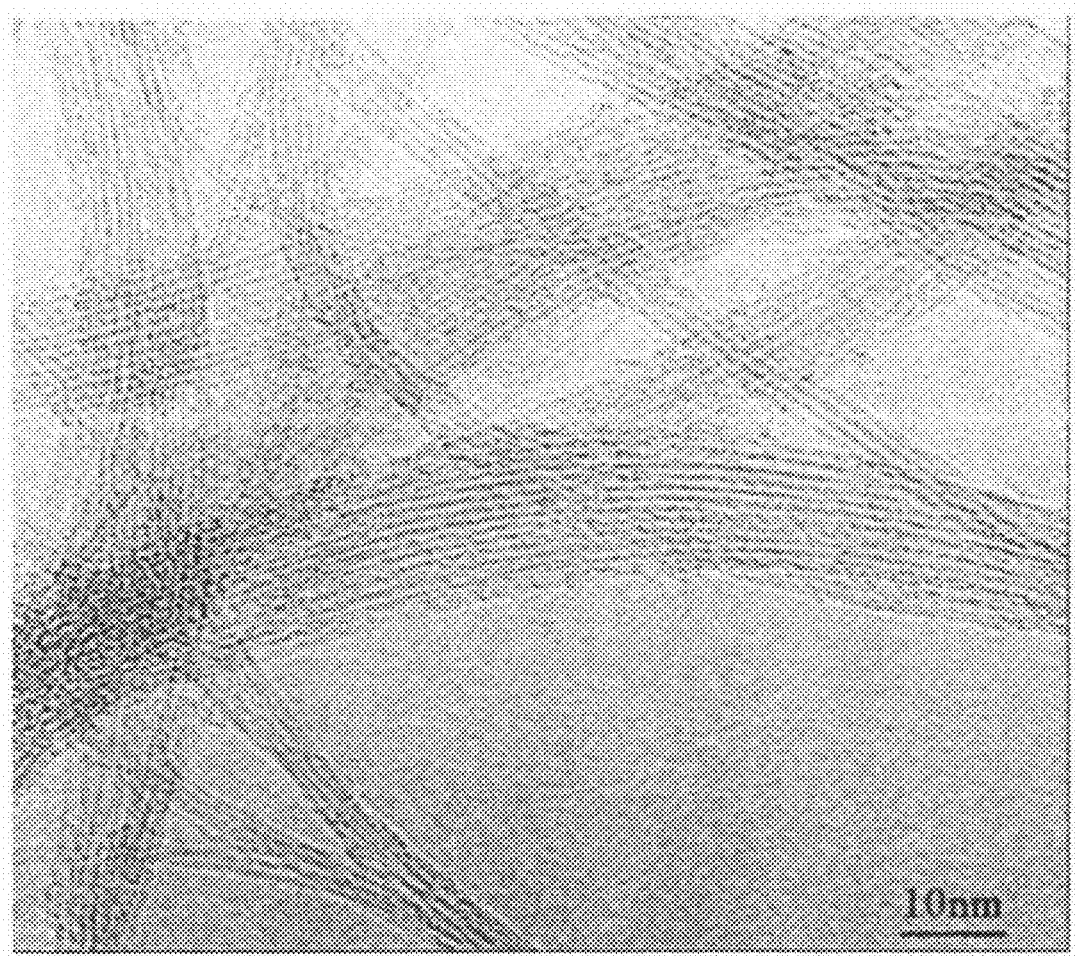
FIG. 5 is a high-resolution transmission electron microscope image of the carbon nanotube-containing composition obtained in Example 3.

(High-resolution Transmission Electron Microscope Analysis of Carbon Nanotube-containing Composition The carbon nanotube-containing composition thus obtained was observed by a high-resolution transmission electron microscope, as a result, as shown in FIG. 5, the carbon nanotubes were constituted by beautiful graphite layers, and carbon nanotubes with outer diameter of about 2 nm and two-layer in the number of layers occupied 70% of the total pieces of carbon nanotubes, and single-walled carbon nanotubes occupied 10% of the total pieces of carbon nanotubes. Hence, of the single-walled and double-walled carbon nanotubes, the ratio of double-walled carbon nanotubes was 80% or more.

(Resonant Raman Spectroscopic Analysis of Carbon Nanotube-containing Composition)

Figure 6:
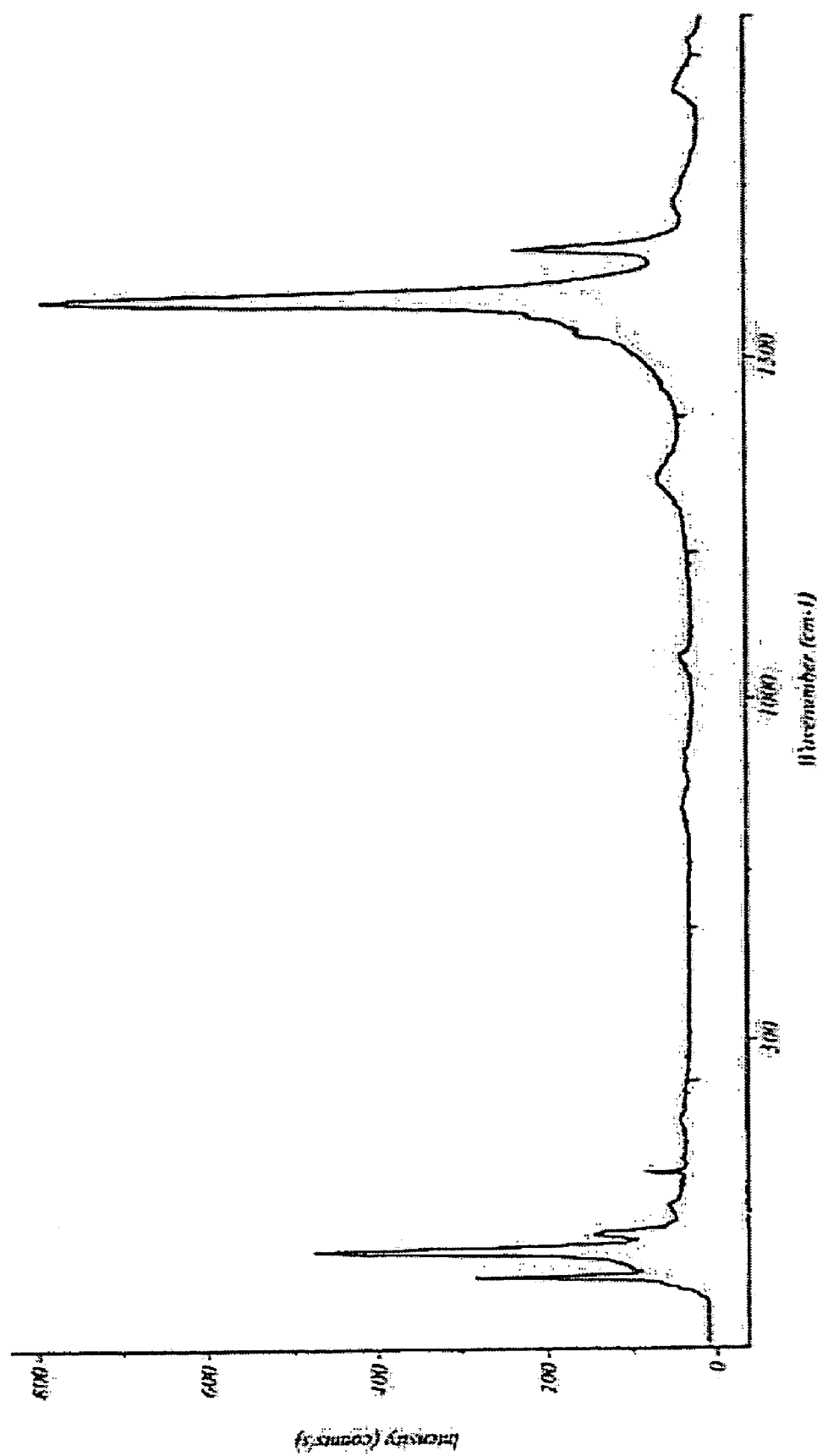
FIG. 6 is a chart of Raman spectrum of the carbon nanotube-containing composition obtained in Example 3.

The composition containing carbon nanotubes thus obtained was measured for Raman scattering. As a result, it was known that one clear peak was detected in a wave number region of 125 cm$^{-1}$ or more, less than 136 cm$^{-1}$, and double-walled carbon nanotubes of thicker than 1.82 nm were contained. Further, three peaks were observed in a wave number region of 125 cm$^{-1}$cm or more, less than 170 cm$^{-1}$. Further, it was known by a Raman spectrometer that G/D ratio was 20 showing high-quality double-walled carbon nanotube with high degree of graphitization (FIG. 6).

(Purification Treatment of Carbon Nanotubes)

Further, to remove the catalyst from the carbon nanotubes, purification treatment was conducted as follows. After burning at 400° C. in air for 1 hour, they were added in 6N aqueous hydrochloric acid solution, and stirred for 2 hours in a water bath of 80° C. The recovered material obtained by filtration was further added in 6N aqueous hydrochloric acid solution, and stirred for one hour in a water bath of 80° C. After filtration and washing with water several times, the filtration residue was dried overnight in an oven of 120° C., thereby magnesia and metal were able to be removed and carbon nanotubes were able to be purified.

Example 4

Figure 7:
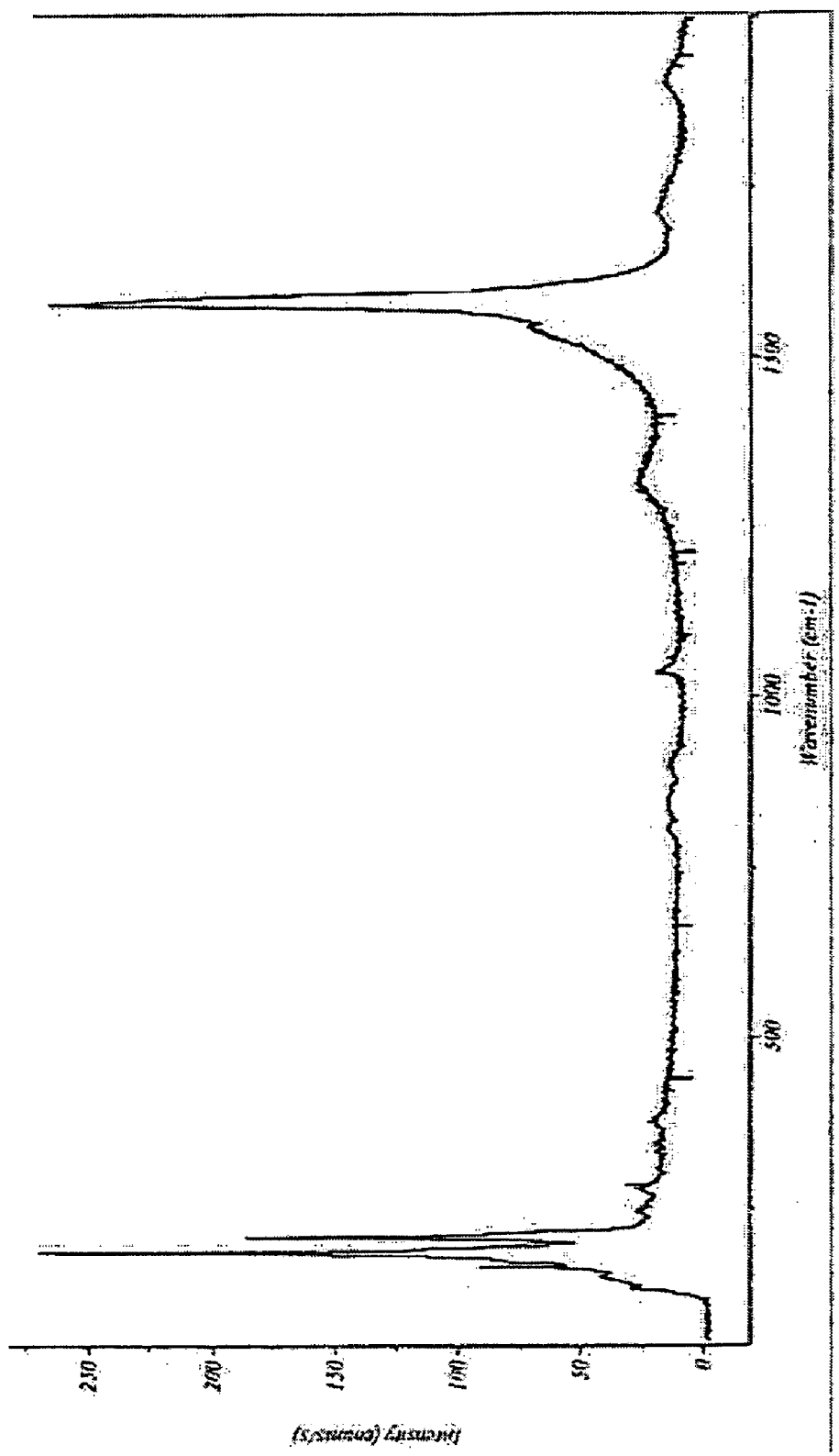
FIG. 7 is a chart of Raman spectrum of the carbon nanotube-containing composition obtained in Example 4.

Using the same reaction system and solid catalyst as in Example 3, after reaching 900° C., methane gas at 9.2 mL/min and nitrogen gas at 188 mL/min (methane concentration 4.7 vol %) were supplied under a reaction pressure condition of $1\times10^5$ Pa (1 atmospheric pressure) for 60 minutes, then, supply of methane gas was stopped, and the temperature was cooled to room temperature under a stream of nitrogen to take out a composition containing catalyst and carbon nanotubes. The linear velocity of methane in this reaction condition is $4.7\times10^{-3}$ cm/sec. The composition containing carbon nanotube thus obtained was measured by a resonant Raman spectrometer. As a result, one clear peak was detected in a wave number region of 125 $cm^{-1}$ or more, less than 136 $cm^{-1}$. Further, it was known that G/D ratio was 19 showing carbon nanotubes with high degree of graphitization (FIG. 7).

Example 5

Figure 8:
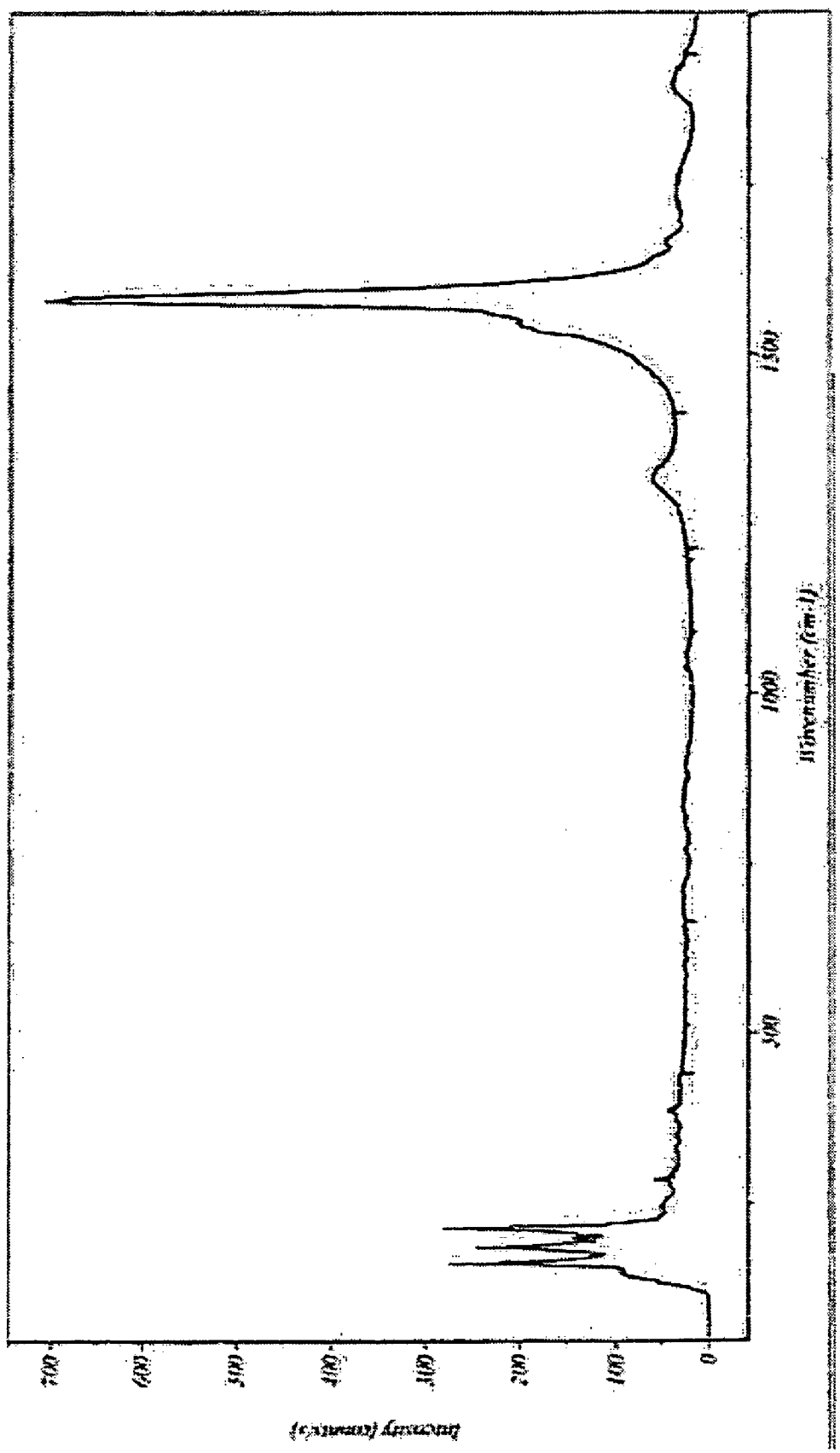
FIG. 8 is a chart of Raman spectrum of the carbon nanotube-containing composition obtained in Example 5.

Using the same reaction system and solid catalyst as in Example 3, after reaching 900° C., methane gas at 18 mL/min and nitrogen gas at 376 mL/min (methane concentration 4.7 vol %) were supplied under a reaction pressure condition of $1\times10^5$ Pa (1 atmospheric pressure) for 60 minutes, then, supply of methane gas was stopped, and the temperature was cooled to room temperature under a stream of nitrogen to take out a composition containing catalyst and carbon nanotubes. The linear velocity of methane in this reaction condition is $9.4\times10^{-3}$ cm/sec. The composition containing carbon nanotubes thus obtained was measured by a resonant Raman spectrometer. As a result, one clear peak was detected in a wave number region of 125 $cm^{-1}$ or more, less than 136 $cm^{-1}$. Further, it was known that G/D ratio was 20 showing carbon nanotubes with high degree of graphitization (FIG. 8).

Example 6

Supporting Metal Salt on Light Magnesia 0.5 g of iron ammonium citrate (manufactured by Wako Pure Chemical Industries Ltd.) was dissolved in 25 mL of methanol (manufactured by Kanto Chemical Co., Ltd). To this solution, 5 g of light magnesia (manufactured by Wako Pure Chemical Industries Ltd.) was added, treated for 60 minutes by an ultrasonic cleaner, and methanol was removed by drying while stirring at 40° C., thereby to obtain a solid catalyst that metal salt was supported on light magnesia powder. The bulk density of the catalyst obtained was 0.61 g/mL.

(Synthesis of Carbon Nanotubes)

On a quartz wool in the center of a vertical quartz tube of 64 mm in inner diameter installed in an electric furnace, 1.0 g of the solid catalyst prepared above was sampled, and nitrogen was supplied at 1600 mL/min. After inside of the quartz tube was sufficiently replaced with nitrogen, a center temperature was raised to 800° C. over 60 minutes. After reaching 800° C., ethylene gas at 36 mL/min and nitrogen gas at 4500 mL/min (ethylene concentration 0.8 vol %, linear velocity 2.35 cm/sec) were supplied under a reaction pressure condition of $1\times10^5$ Pa (1 atmospheric pressure) for 60 minutes, then, supply of ethylene gas was stopped, and the temperature was cooled to room temperature under a stream of nitrogen to take out a composition containing catalyst and carbon nanotubes. The pyrolysis rate of ethylene gas in this reaction condition is 1.7%. All gases flowing in the reaction tube were flowed toward an upper part direction from the lower part.

(Resonant Raman Spectroscopic Analysis of Carbon Nanotube-containing Composition)

Figure 9:
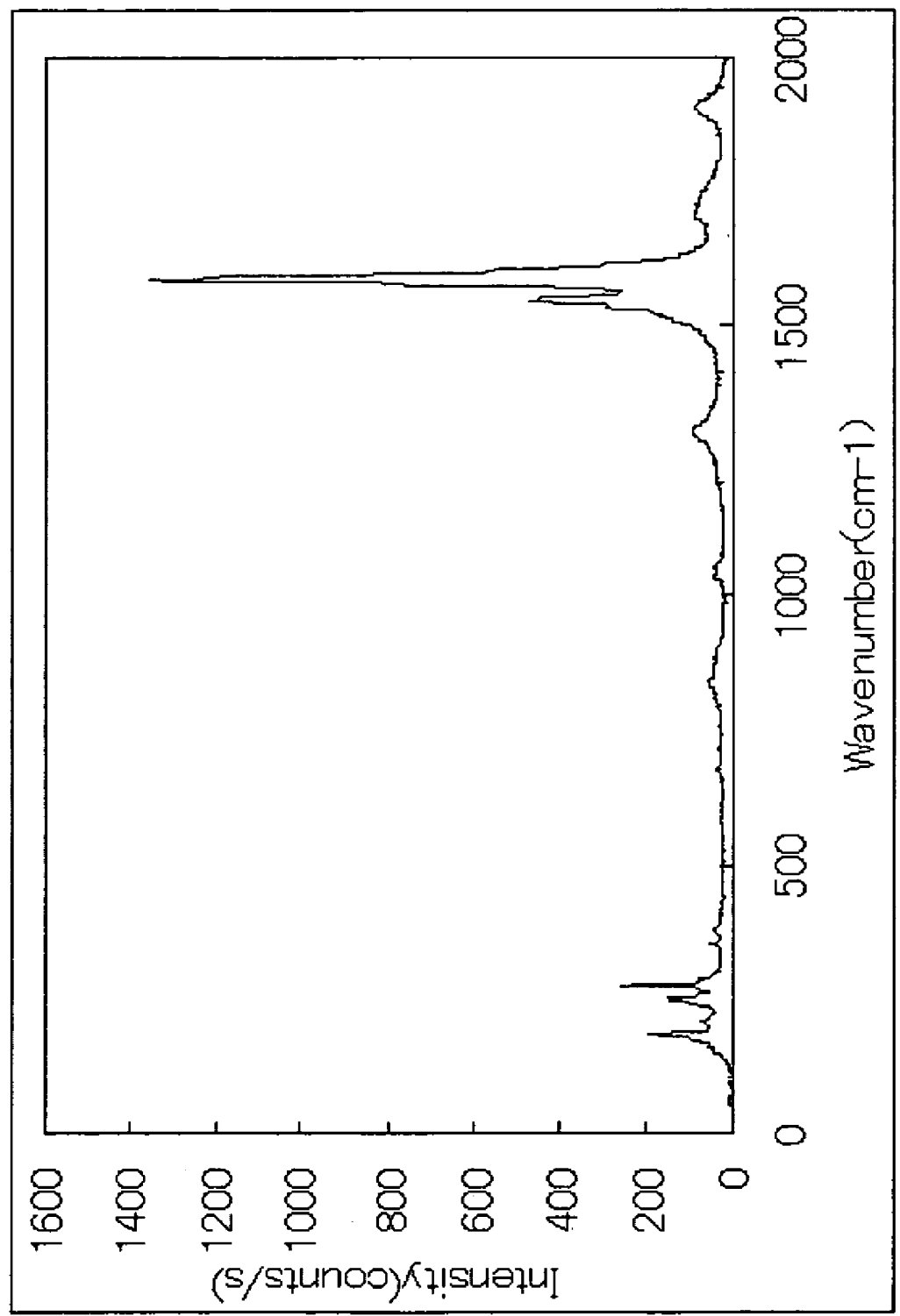
FIG. 9 is a chart of Raman spectrum of the carbon nanotube-containing composition obtained in Example 6.

The composition containing carbon nanotubes obtained by the above-described synthesis was measured by a resonant Raman spectrometer, and the result is shown in FIG. 9. When laser light of wavelength 633 nm was used, it was known that G/D ratio was 20 showing high quality carbon nanotubes with high degree of graphitization.

(Differential Thermal and Thermogravimetric Simultaneous Measurement of Carbon Nanotube-containing Composition)

Part of the carbon nanotube-containing composition obtained by the above-described synthesis was sampled, and subjected to a differential thermal and thermogravimetric simultaneous measurement to find the weight decrease of 8%.

(Field Emission Scanning Microscope Analysis of Carbon Nanotube-containing Composition)

Figure 10:
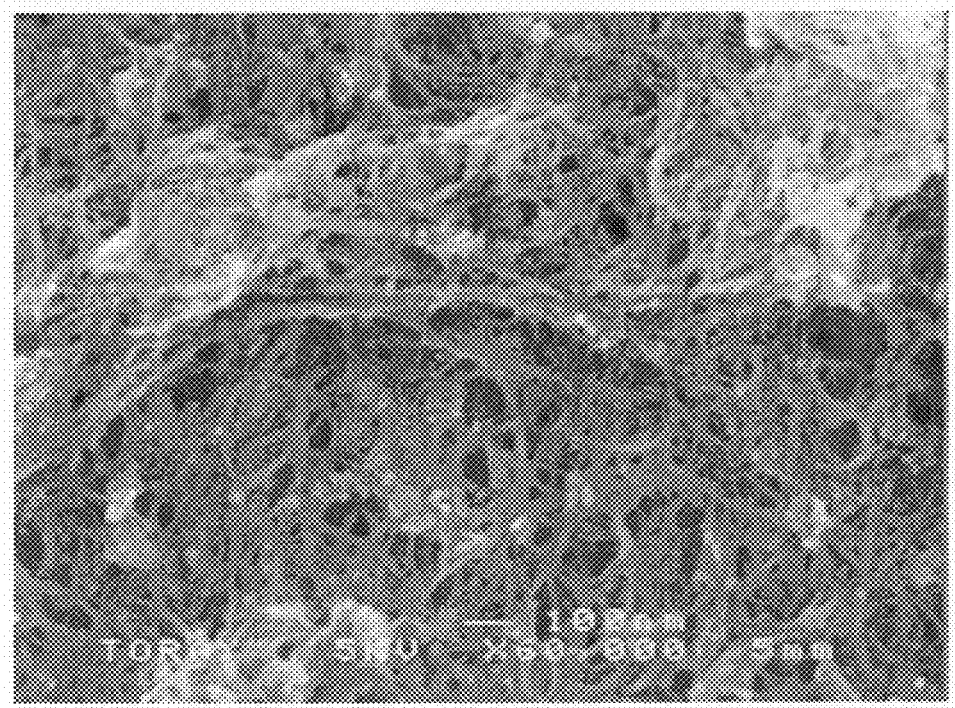
FIG. 10 is a field emission scanning electron microscope image of the carbon nanotube-containing composition obtained in Example 6.

The carbon nanotube-containing composition obtained by the above-described synthesis was observed by a field emission scanning microscope, and single-walled carbon nanotubes constituting a bundle of several ten nm were observed as shown in FIG. 10.

(High-resolution Transmission Electron Microscope Analysis of Carbon Nanotube-containing Composition)

Figure 11:
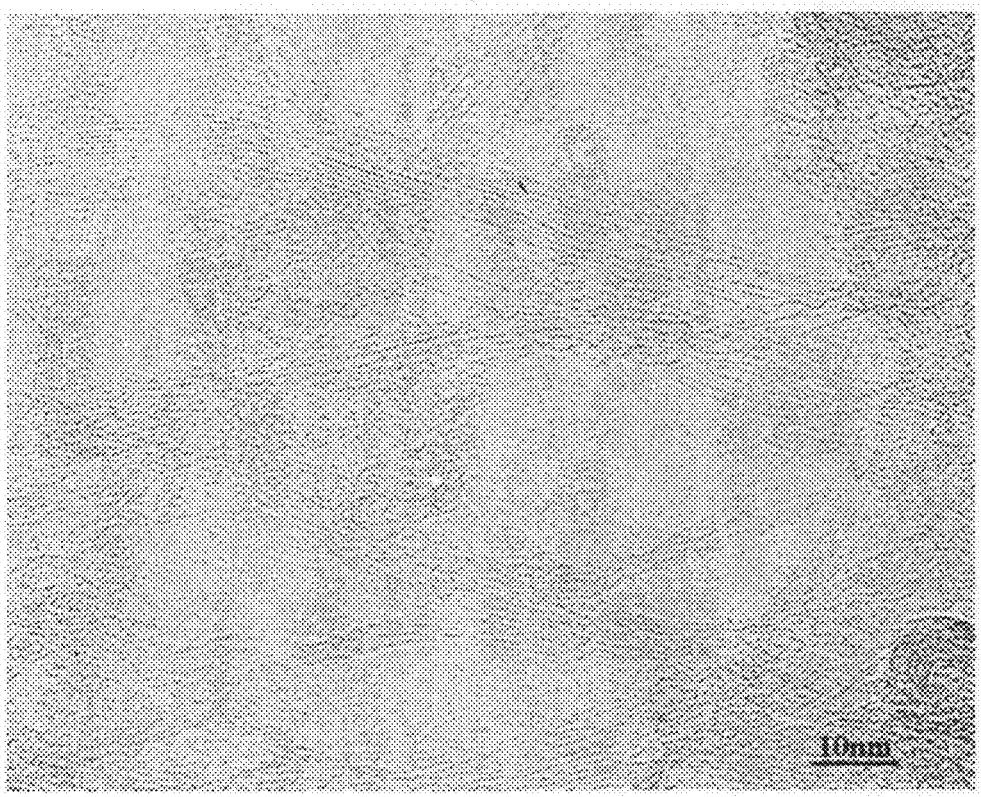
FIG. 11 is a high-resolution transmission electron microscope image of the carbon nanotube-containing composition obtained in Example 6.

The carbon nanotube-containing composition obtained by the above-described synthesis was observed by a high-resolution transmission electron microscope, as a result, as shown in FIG. 11, the carbon nanotubes were constituted by beautiful graphite layers, and many carbon nanotubes with outer diameter of about 1 nm were observed. When the ratio of single-walled carbon nanotubes was observed by the high-resolution transmission electron microscope, carbon nanotubes of single layer in the number of layers occupied 50% of the total pieces of carbon nanotubes.

(Purification Treatment of Carbon Nanotubes)

Further, to remove the catalyst from the carbon nanotubes obtained by the above-described synthesis, purification treatment was conducted as follows. After burning the carbon nanotube-containing composition at 400° C. in air for 1 hour, they were added in 6N aqueous hydrochloric acid solution, and stirred for 2 hours in a water bath of 80° C. The recovered material obtained by filtration was added in 6N aqueous hydrochloric acid solution, and stirred for one hour in a water bath of 80° C. After filtration and washing with water several times, the filtration residue was added to a mixed liquid of toluene/water (=1/1), subjected to ultrasonic treatment for 30 minutes, then shaken for 5 minutes. The toluene layer was batched off and filtered, then the filtration residue was dried overnight in an oven of 120° C., thereby to remove magnesia and catalyst, and the purified carbon nanotubes were able to be obtained.

(Dilute Oxygen Treatment of Composition Containing Carbon Nanotubes)

Regarding the composition containing carbon nanotubes subjected to the above purification treatment, by conducting an oxidation treatment with oxygen of 5% concentration, the amount of impurities such as amorphous carbon was estimated. Low thermal resistant impurities such as amorphous carbon were selectively burned away by oxygen of dilute concentration, carbon nanotubes having crystallizability and high thermal resistance remain, so that the mixed amount of impurities can be estimated.

On a quartz wool in the center of a vertical quartz tube of 64 mm in inner diameter installed in an electric furnace, a crucible in which 0.1 g of the composition containing carbon nanotubes purified above had been sampled was placed, and nitrogen was supplied at 1000 mL/min. After a center temperature was raised to 500° C. over 60 minutes, a mixed gas consisting of 5% oxygen and 95% nitrogen was supplied under the condition of 2100 mL/min for 30 minutes, then, supply of oxygen was stopped, and the temperature was cooled to room temperature under a stream of nitrogen to take out a composition containing catalyst and carbon nanotubes. All gases flowing in the reaction tube were flowed toward a lower part direction from the upper part. In this time, the weight-decreasing degree of the carbon nanotube-containing composition was 35%, namely it is thought that 65% is carbon nanotubes.

Example 7

Using the same reaction system and solid catalyst as in Example 6, after reaching 800° C., ethylene gas at 5.4 mL/min and nitrogen gas at 671 mL/min (ethylene concentration 0.8%, linear velocity 0.35 cm/sec) were supplied under a reaction pressure condition of $1 \times 10^5$ Pa (1 atmospheric pressure) for 60 minutes, then, supply of ethylene gas was stopped, and the temperature was cooled to room temperature under a stream of nitrogen to take out a composition containing carbon nanotubes. The pyrolysis rate of ethylene gas in this reaction condition is 9.5%. The carbon nanotube-containing composition thus obtained was measured by a resonant Raman spectrometer, as a result, it was known that G/D ratio was 17 showing carbon nanotubes with high degree of graphitization.

Example 8

A composition containing catalyst and carbon nanotubes was synthesized, using the same reaction system and solid catalyst as in Example 6, in the same reaction condition as in Example 6 except that the reaction temperature was 900° C. The pyrolysis rate of ethylene gas in this reaction condition is 8.2%. The carbon nanotube-containing composition thus obtained was measured by a resonant Raman spectrometer, as a result, it was known that G/D ratio was 23 showing carbon nanotubes with high degree of graphitization.

Example 9

0.16 g of iron ammonium citrate (manufactured by Wako Pure Chemical Industries Ltd.) was dissolved in 25 mL of methanol (manufactured by Kanto Chemical Co., Ltd). To this solution, 5 g of light magnesia (manufactured by Wako Pure Chemical Industries Ltd.) was added, treated for 60 minutes by an ultrasonic cleaner, and methanol was removed by drying while stirring at 40° C., thereby to obtain a solid catalyst that metal salt was supported on light magnesia powder. The bulk density of the catalyst obtained was 0.60 g/mL.

(Synthesis of Carbon Nanotubes)

A composition containing catalyst and carbon nanotubes was obtained by reacting with the above-described catalyst in the same reaction system and reaction condition as in Example 6. The carbon nanotube-containing composition thus obtained was measured by a resonant Raman spectrometer, as a result, it was known that G/D ratio was 19 showing carbon nanotubes with high degree of graphitization. Further, the carbon nanotube-containing composition was subjected to a differential thermal and thermogravimetric simultaneous measurement to find the weight decrease of 9%.

Further, as a result of the same dilute oxidation treatment as in Example 6, the weight-decreasing degree of the carbon nanotube-containing composition was 19%, namely 81% was carbon nanotubes.

Example 10

Supporting Metal Salt on Light Magnesia 10 g of iron ammonium citrate (manufactured by Wako Pure Chemical Industries Ltd.) was sampled in an eggplant-shaped flask of 500 mL, and dissolved by adding 300 mL of ethanol (manufactured by Kanto Chemical Co., Ltd). Next, 100 g of light magnesia (manufactured by Wako Pure Chemical Industries Ltd.) was added thereto, dispersed in ethanol solvent, then treated for 30 minutes by an ultrasonic cleaner. Thereafter, ethanol was removed using an evaporator at 40° C., thereby to obtain a solid catalyst that metal salt was supported on magnesia. The bulk density of the catalyst obtained was 0.60 g/mL.

(Synthesis of Carbon Nanotubes)

Figure 12:
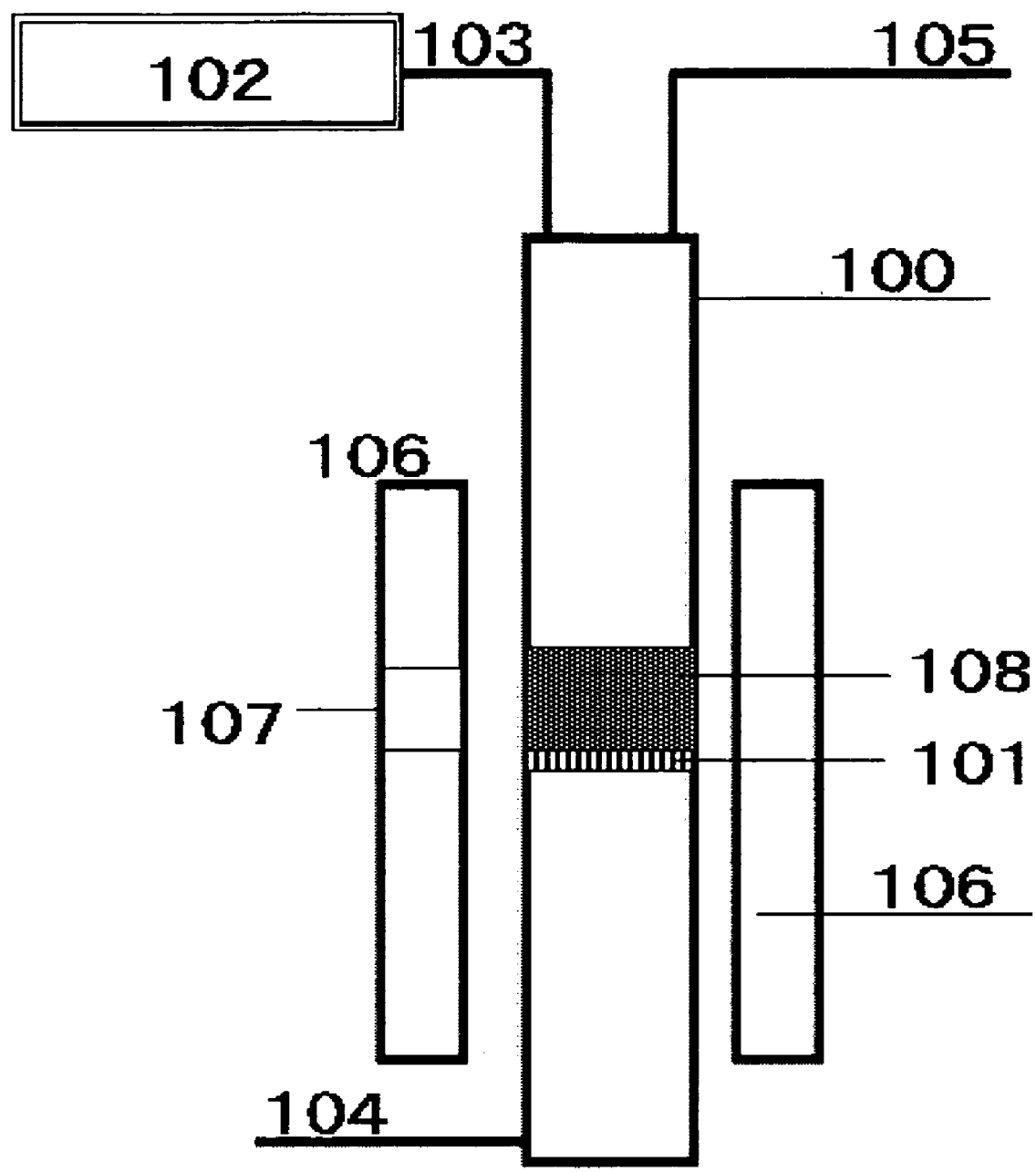
FIG. 12 is a conceptual illustration of the fluid bed equipment used in Example 10.

Carbon nanotubes were synthesized using a vertical reactor shown in FIG. 12.

A reactor 100 is a cylindrical quartz tube of 32 mm in inner diameter and 120 mm in length. A quartz sintered plate 101 is equipped in the center part, an inert gas and raw gas supply line 104 is equipped in the lower part of the quartz tube, and in the upper part, a waste gas line 105 and a catalyst input line 103 are equipped. Further, to keep a reactor in an arbitrary temperature, a heater 106 surrounding the periphery of the reactor is equipped. The heater 106 is provided with an inspection port 107 to be able to confirm a flow state in equipment.

Solid mixed catalyst of 8 g was sampled, and the catalyst was set on the quartz sintered plate 101 through the catalyst input line 103. Next, supply of argon gas was started from the gas supply line 104 at 1000 mL/min. After inside of the reactor was replaced with argon gas atmosphere, temperature was raised to 800° C. (rising temperature time of 30 minutes).

After temperature reached 800° C., the temperature was kept, flow rate of argon in the gas supply line 104 was increased at 1980 mL/min, fluidization of solid catalyst on the quartz sintered plate was started. After fluidization was confirmed through the inspection port 107 of heating furnace, argon was changed with a gas whose composition was adjusted to 1 vol % ethylene and 99 vol % argon, and the supply to the reactor was started at 20000 mL/min. After the mixed gas was supplied for 30 minutes. It was changed to flow of argon alone, thereby finishing the synthesis.

Heating was stopped and being allowed to stand till room temperature, and after reaching room temperature, a composition containing catalyst and carbon nanotubes was taken out from the reactor. The catalyst was partly leaked from the reactor together with waste gas, and the amount of the carbon nanotube-containing composition was 6.5 g.

As a result of thermal analysis measurement of the carbon nanotube-containing composition by a themogravimetric analyzer (TGA), the weight of carbon was 8%. As a result of measurement by a resonant Raman spectroscopy, it was known that G/D ratio was 15 showing carbon nanotubes with high degree of graphitization.

Comparative Example 1

Supporting Metal Salt on Heavy Magnesia 4.92 g of iron ammonium citrate (manufactured by Wako Pure Chemical Industries Ltd.) was dissolved in 250 mL of methanol (manufactured by Kanto Chemical Co., Ltd). To this solution, 50.0 g of heavy magnesia (manufactured by Wako Pure Chemical Industries Ltd.) was added, treated for 60 minutes by an ultrasonic cleaner, and methanol was removed by drying at 80° C., thereby to obtain a solid catalyst that metal salt was supported on light magnesia powder. The bulk density of the catalyst obtained was 0.72 g/mL.

(Synthesis of Carbon Nanotubes)

A composition containing catalyst and carbon nanotubes was obtained by conducting reaction in the same reaction system and reaction condition as in Example 1 except that the solid catalyst prepared above was used.

(Thermal Analysis of Carbon Nanotube-containing Composition)

The thermal analysis of the carbon nanotube-containing composition thus obtained was conducted to find the weight decrease of 9%.

(Resonant Raman Spectroscopic Analysis of Carbon Nanotube-containing Composition)

Figure 13:
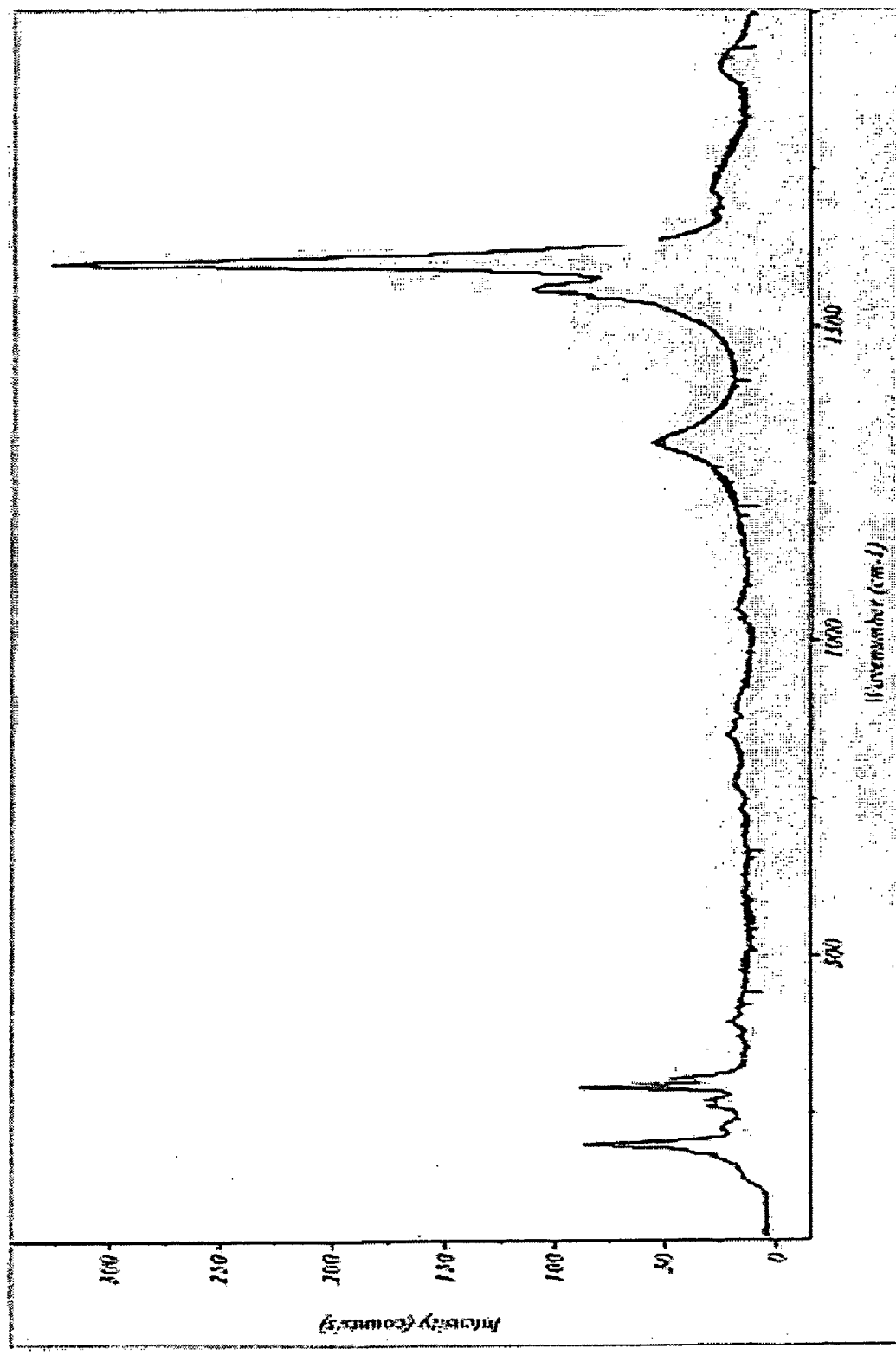
FIG. 13 is a chart of Raman spectrum of the carbon nanotube-containing composition obtained in Comparable Example 1.

The carbon nanotube-containing composition thus obtained was measured by a resonant Raman spectrometer, as a result, it was known that G/D ratio was 8 (FIG. 13). It was known from high D band that there were a lot of amorphous carbon and defects of CNT.

(High-resolution Transmission Electron Microscope Analysis of Carbon Nanotube-containing Composition)

Figure 14:
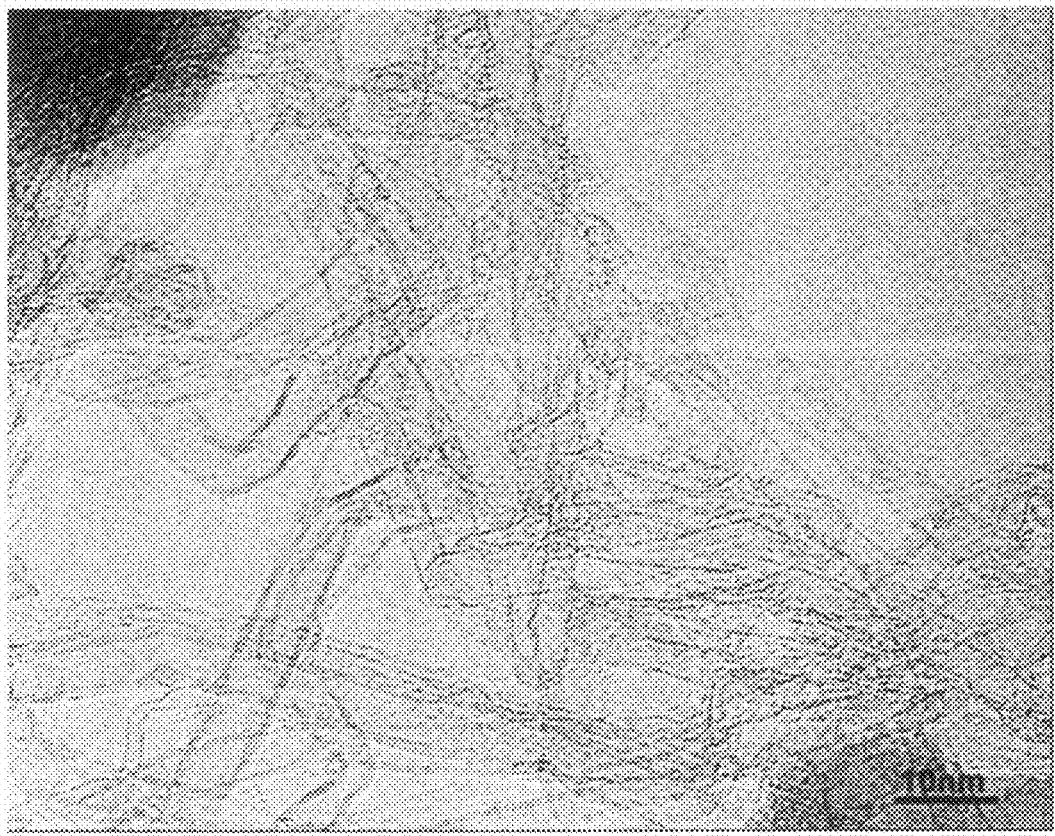
FIG. 14 a high-resolution transmission electron microscope image of the carbon nanotube-containing composition obtained in Comparable Example 1.

The carbon nanotube-containing composition thus obtained was observed using a high-resolution transmission electron microscope, as a result, carbon nanotubes with inner diameter of 2 nm or less were hardly observed (20 pieces or less), and carbon nanotubes with large outer diameter (3 nm or more) were observed (FIG. 14).

Comparative Example 2

Supporting Metal Salt on Magnesia 0.5 g of iron ammonium citrate (manufactured by Wako Pure Chemical Industries Ltd.) was dissolved in 25 mL of methanol (manufactured by Kanto Chemical Co., Ltd). To this solution, 5 g of magnesia (manufactured by Ako Kasei Co., Ltd.) was added, treated for 60 minutes by an ultrasonic cleaner, and methanol was removed by drying while stirring at 40° C., thereby to obtain a solid catalyst that metal salt was supported on light magnesia powder. The bulk density of the catalyst obtained was 0.94 g/mL.

(Synthesis of Carbon Nanotubes)

On a quartz wool in the center of a vertical quartz tube of 64 mm in inner diameter installed in an electric furnace, 1.0 g of the solid catalyst prepared above was sampled, and nitrogen was supplied at 1600 mL/min. After inside of the quartz tube was sufficiently replaced with nitrogen, a center temperature was raised to 800° C. over 60 minutes. After reaching 800° C., acetylene gas at 36 mL/min and nitrogen gas at 4500 mL/min (acetylene concentration 0.79 vol %, linear velocity 2.35 cm/sec) were supplied under a reaction pressure condition of $1\times10^5$ Pa (1 atmospheric pressure) for 60 minutes, then, supply of acetylene gas was stopped, and the temperature was cooled to room temperature under a stream of nitrogen to take out a composition containing catalyst and carbon nanotubes. All gases flowing in the reaction tube were flowed toward an upper part direction from the lower part.

(Resonant Raman Spectroscopic Analysis of Carbon Nanotube-containing Composition)

Figure 15:
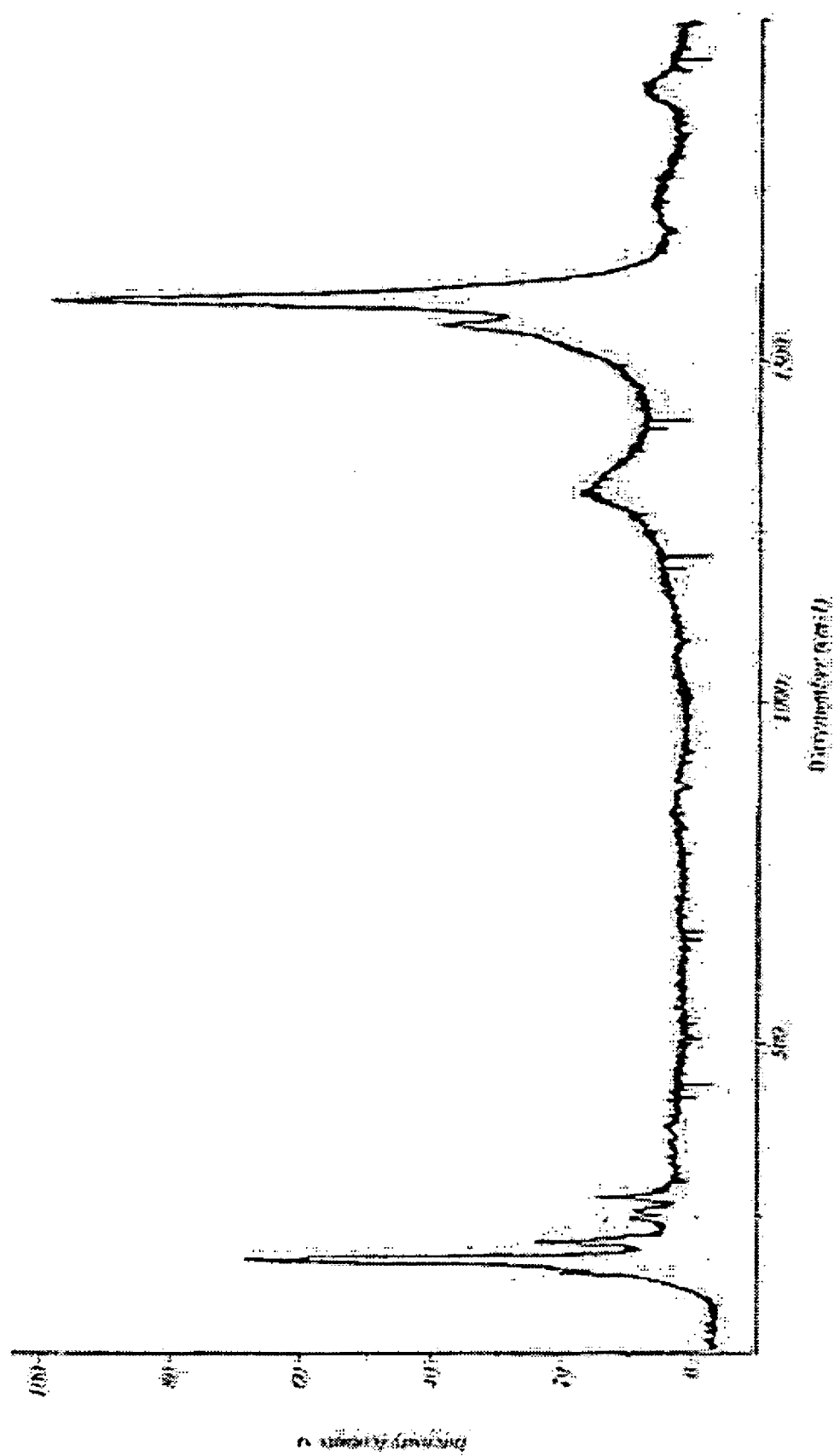
FIG. 15 is a chart of Raman spectrum of the carbon nanotube-containing composition obtained in Comparative Example 2.

The carbon nanotube-containing composition obtained by the above-described synthesis was measured by a resonant Raman spectrometer, and the result is shown in FIG. 15. When laser light of wavelength 633 nm was used, it was known that G/D ratio was 10.

Comparative Example 3

Preparation of Metal-Supported Magnesia 0.07 g of iron ammonium citrate (manufactured by Wako Pure Chemical Industries Ltd.) was dissolved in 50 mL of methanol (manufactured by Kanto Chemical Co., Ltd). To this solution, 14.6 g of magnesium hydroxide (manufactured by Wako Pure Chemical Industries Ltd.) was added, stirred for 5 minutes, and methanol was removed by drying while stirring at 40° C. Thereafter, it was burned at 550° C. in air for 3 hours, thereby to obtain a solid catalyst that metal salt was supported on magnesia powder. The bulk density of the catalyst obtained was 0.26 g/mL.

(Synthesis of Carbon Nanotubes)

On a quartz wool in the center of a vertical quartz tube of 64 mm in inner diameter installed in an electric furnace, 1.0 g of the solid catalyst prepared above was sampled, and nitrogen was supplied at 1600 mL/min. After inside of the quartz tube was sufficiently replaced with nitrogen, a center temperature was raised to 800° C. over 60 minutes. After reaching 800° C., acetylene gas at 36 mL/min and nitrogen gas at 4500 mL/min (acetylene concentration 0.79 vol %, linear velocity 2.35 cm/sec) were supplied under a reaction pressure condition of $1\times10^5$ Pa (1 atmospheric pressure) for 60 minutes, then, supply of acetylene gas was stopped, and the temperature was cooled to room temperature under a stream of nitrogen. It turned black up to a position higher than the catalyst-filled position in the reaction tube, thus, catalyst was thought to be scattered. All gases flowing in the reaction tube were flowed toward an upper part direction from the lower part.

(Resonant Raman Spectroscopic Analysis of Carbon Nanotube-containing Composition)

The composition containing carbon nanotubes thus obtained was measured by a resonant Raman spectrometer, as a result, it was known that G/D ratio was 1.0, and there were a lot of amorphous carbon and defects of CNT.

Comparative Example 4

Supporting Metal Salt on Silica 0.5 g of iron ammonium citrate (manufactured by Wako Pure Chemical Industries Ltd.) was dissolved in 25 mL of methanol (manufactured by Kanto Chemical Co., Ltd). To this solution, 5.0 g of silica (JRC-SIO-5, see Catalyst Society of Japan) was added, treated for 60 minutes by an ultrasonic cleaner, and methanol was removed by drying at 80° C., thereby to obtain a solid catalyst that metal salt was supported on alumina powder. The bulk density of the catalyst obtained was 0.29 g/mL.

(Synthesis of Carbon Nanotubes)

A composition containing carbon nanotubes was obtained by conducting reaction in the same reaction system and reaction condition as in Example 1 except that the solid catalyst prepared above was used.

(Thermal Analysis of Carbon Nanotube-containing Composition)

The thermal analysis of the carbon nanotube-containing composition thus obtained was conducted to find the weight decrease of 30%.

(Resonant Raman Spectroscopic Analysis of Composition Containing Carbon Nanotubes)

Figure 16:
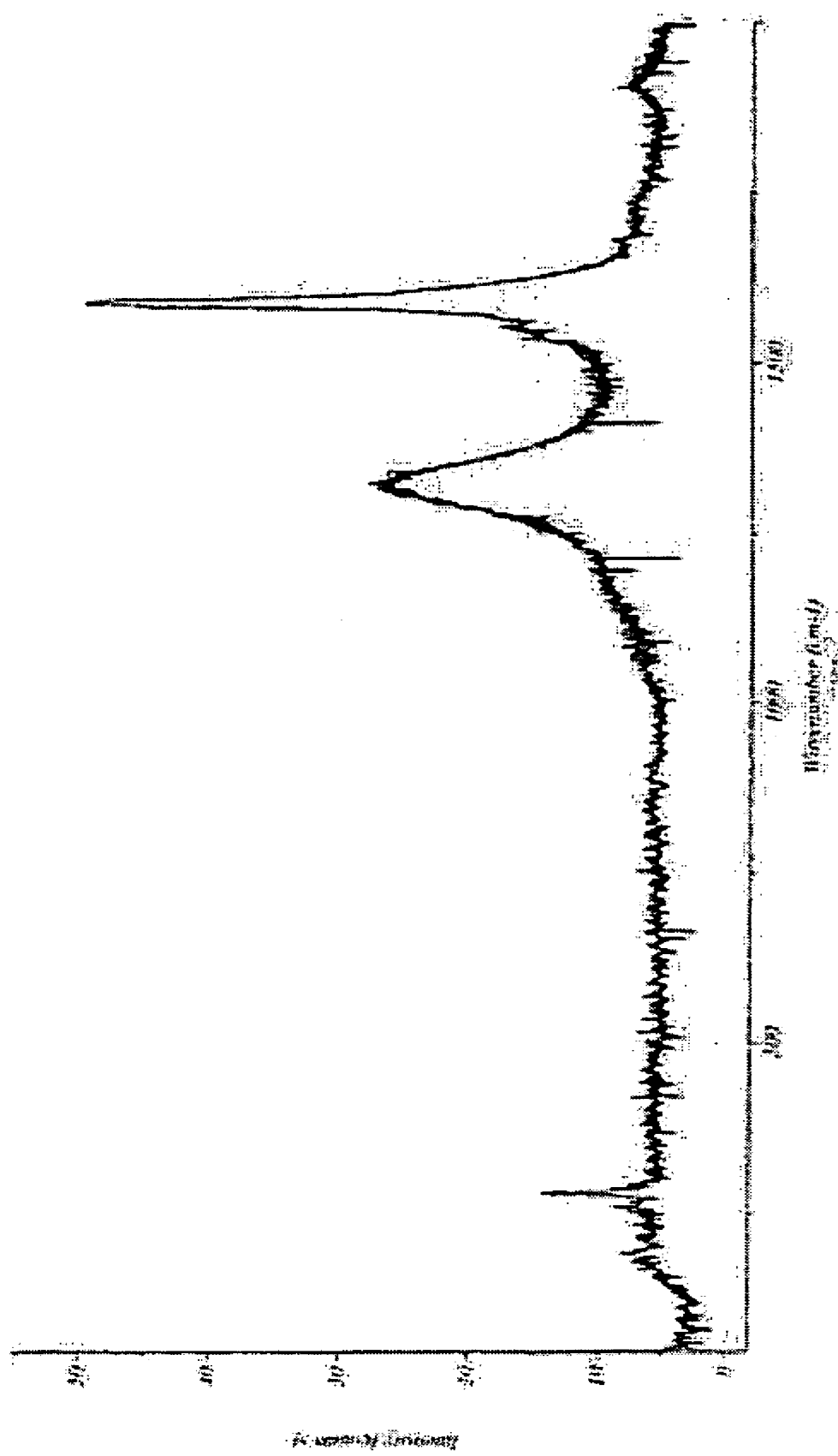
FIG. 16 is a chart of Raman spectrum of the carbon nanotube-containing composition obtained in Comparative Example 3.

The carbon nanotube-containing composition thus obtained was measured by a resonant Raman spectrometer, as a result, it was known that G/D ratio was 2.0 (FIG. 16). It was known from high D band that there were a lot of amorphous carbon and defects of CNT.

Comparative Example 5

Supporting Metal Salt on Alumina 0.5 g of iron ammonium citrate (manufactured by Wako Pure Chemical Industries Ltd.) was dissolved in 25 mL of methanol (manufactured by Kanto Chemical Co., Ltd). To this solution, 5.0 g of alumina (JRC-ALO-4, see Catalyst Society of Japan) was added, treated for 60 minutes by an ultrasonic cleaner, and methanol was removed by drying at 80° C., thereby to obtain a solid catalyst that metal salt was supported on alumina powder. The bulk density of the catalyst obtained was 0.71 g/mL.

(Synthesis of Carbon Nanotubes)

A composition containing carbon nanotubes was obtained by conducting reaction in the same reaction system and reaction condition as in Example 1 except that the solid catalyst prepared above was used.

(Thermal Analysis of Carbon Nanotube-containing Composition)

The thermal analysis of the carbon nanotube-containing composition thus obtained was conducted to find the weight decrease of 21.4%.

(Resonant Raman Spectroscopic Analysis of Carbon Nanotube-containing Composition)

Figure 17:
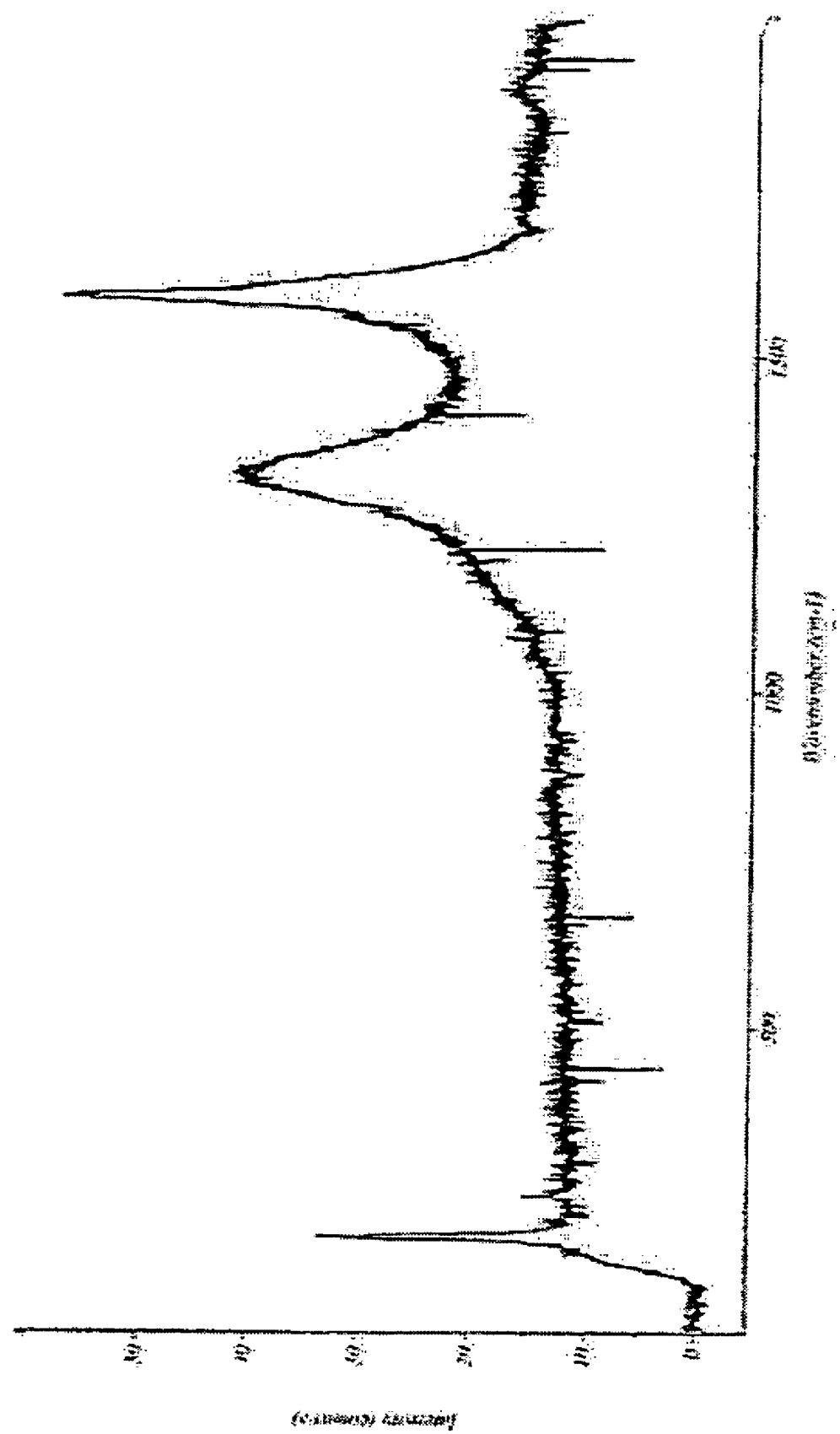
FIG. 17 is a chart of Raman spectrum of the carbon nanotube-containing composition obtained in Comparative Example 4.

The composition containing carbon nanotubes thus obtained was measured by a resonant Raman spectrometer, as a result, it was known that G/D ratio was 1.7 (FIG. 17). It was known from high D band that there were a lot of amorphous carbon and defects of CNT.

Comparative Example 6

Supporting Metal Salt on Magnesia 10 g of iron ammonium citrate (manufactured by Kanto Chemical Co. Ltd.) was sampled in an eggplant-shaped flask of 500 mL, and dissolved by adding 300 mL of ethanol (manufactured by Kanto Chemical Co., Ltd). Next, 100 g of magnesia UBE95 (manufactured by Ube Material Industries Ltd.) was added thereto, dispersed in ethanol solvent, then treated for 30 minutes by an ultrasonic cleaner. Thereafter, ethanol was removed using an evaporator at 40° C., thereby to obtain a solid catalyst that metal salt was supported on magnesia. The bulk density of the catalyst obtained was 1.44 g/mL.

(Synthesis of Carbon Nanotubes)

Carbon nanotubes were hardly obtained although reaction was conducted in the same reaction system and reaction condition as in Example 10 except that the solid catalyst prepared above was used.

[Table 1]

TABLE 1

| | Support | Bulk density of catalyst (g/mL) | Carbon-containing compound | Linear velocity (cm/sec) | Raman G/D ratio |
|---|---|---|---|---|---|
| Example 1 | Magnesia | 0.68 | Acetylene | 2.35 | 14 |
| Example 2 | Magnesia | 0.50 | Acetylene | 2.35 | 12 |
| Example 3 | Magnesia | 0.61 | Methane | $5.64 \times 10^{-3}$ | 20 |
| Example 4 | Magnesia | 0.61 | Methane | $4.7 \times 10^{-3}$ | 19 |
| Example 5 | Magnesia | 0.61 | Methane | $9.4 \times 10^{-3}$ | 20 |
| Example 6 | Magnesia | 0.61 | Ethylene | 2.35 | 20 |
| Example 7 | Magnesia | 0.61 | Ethylene | 0.35 | 17 |
| Example 8 | Magnesia | 0.61 | Ethylene | 2.35 | 23 |
| Example 9 | Magnesia | 0.60 | Ethylene | 2.35 | 19 |
| Example 10 | Magnesia | 0.60 | Ethylene | 41.4 | 15 |
| Comparative Example 1 | Magnesia | 0.72 | Acetylene | 2.35 | 8 |
| Comparative Example 2 | Magnesia | 0.94 | Acetylene | 2.35 | 10 |
| Comparative Example 3 | Magnesia | 0.26 | Acetylene | 2.35 | 1.0 |
| Comparative Example 4 | Silica | 0.29 | Acetylene | 2.35 | 2.0 |
| Comparative Example 5 | Alumina | 0.71 | Acetylene | 2.35 | 1.7 |
| Comparative Example 6 | Magnesia | 1.44 | Ethylene | 41.4 | — |

INDUSTRIAL APPLICABILITY

According to the present invention, carbon nanotubes of uniformity and high quality can be efficiently synthesized in a large amount.

The invention claimed is:

1. A method for producing a carbon nanotube, wherein a catalyst for carbon nanotube production comprising a powdery catalyst supporting a metal on magnesia and having a bulk density of 0.40 g/mL to 0.70 g/mL, in a vertical reactor, is disposed over the whole area in a horizontal cross section direction of the reactor, and a carbon-containing compound is flowed in a vertical direction inside the reactor to contact said carbon-containing compound with said catalyst at 500 to 1200° C.

2. The method for producing a carbon nanotube of claim 1, wherein the vertical reactor having a reactor installed in a vertical direction has a mechanism that a carbon-containing compound flows in a direction toward the other end from one end of said vertical reactor for said carbon-containing compound so as to pass through a catalyst layer formed by the catalyst for carbon nanotube production.

3. The method for producing a carbon nanotube of claim 1, wherein said vertical reactor is a fluid bed reactor.

4. The method for producing a carbon nanotube of claim 1, wherein said magnesia is light magnesia.

5. The method for producing a carbon nanotube of claim 1, wherein said magnesia has a pore of 1 to 50 nm in diameter.

6. The method for producing a carbon nanotube of claim 5, wherein a pore content of said magnesia is 0.10 mL/g or more.

7. The method for producing a carbon nanotube of claim 1, wherein said metal is a metal containing at least Fe.

8. The method for producing a carbon nanotube of claim 1, wherein said carbon-containing compound flows as a mixed gas, and a concentration of the carbon-containing compound in the mixed gas is 2 vol % or less.

9. The method for producing a carbon nanotube of claim 1, wherein said carbon-containing compound contains at least one selected from methane, ethane, ethylene, acetylene, propane and propylene.

10. The method for producing a carbon nanotube of claim 1, wherein said carbon nanotube is a carbon nanotube of 2 nm or less in inner diameter as the main product.

11. The method for producing a carbon nanotube of claim 1, wherein said carbon-containing compound is contacted with a catalyst for carbon nanotube production for the pyrolysis rate to be 10% or less.

12. The method for producing a carbon nanotube of claim 1, wherein said carbon-containing compound is a carbon-containing compound having carbon numbers of 2 or more and a linear velocity of said carbon-containing compound flowed is 0.20 cm/sec or more.

13. The method for producing a carbon nanotube of claim 1, wherein said carbon-containing compound is methane or a mixture containing methane, which is contacted with a catalyst for carbon nanotube production at the linear velocity of $9.5 \times 10^{-3}$ cm/sec or less.

* * * * *